(12) United States Patent
Choi

(10) Patent No.: US 11,637,662 B2
(45) Date of Patent: Apr. 25, 2023

(54) DATA TRANSMISSION METHOD FOR ULTRA-LOW LATENCY AND HIGHLY-RELIABLE COMMUNICATION IN WIRELESS COMMUNICATION SYSTEM, AND APPARATUS THEREFOR

(71) Applicant: UUCOM CO., LTD, Kwacheon (KR)

(72) Inventor: Su Han Choi, Gwacheon-Si (KR)

(73) Assignee: UUCOM CO., LTD, Kwacheon (KR)

( * ) Notice: Subject to any disclaimer, the term of this patent is extended or adjusted under 35 U.S.C. 154(b) by 0 days.

(21) Appl. No.: 17/631,438

(22) PCT Filed: Aug. 5, 2020

(86) PCT No.: PCT/KR2020/010313
§ 371 (c)(1),
(2) Date: Jan. 28, 2022

(87) PCT Pub. No.: WO2021/029595
PCT Pub. Date: Feb. 18, 2021

(65) Prior Publication Data
US 2022/0271880 A1 Aug. 25, 2022

(30) Foreign Application Priority Data

Aug. 9, 2019 (KR) .................. 10-2019-0097246
Aug. 9, 2019 (KR) .................. 10-2019-0097247
(Continued)

(51) Int. Cl.
*H04W 72/04* (2009.01)
*H04L 5/00* (2006.01)
*H04L 1/08* (2006.01)

(52) U.S. Cl.
CPC .............. *H04L 5/0012* (2013.01); *H04L 1/08* (2013.01); *H04L 5/0064* (2013.01); *H04W 72/042* (2013.01)

(58) Field of Classification Search
CPC . H04W 76/28; H04W 72/042; H04W 52/365; H04W 52/34; H04W 24/10;
(Continued)

(56) References Cited

U.S. PATENT DOCUMENTS 9,882,689 B2 * 1/2018 Yu .................. H04W 24/02
2009/0323608 A1 * 12/2009 Adachi ............. H04W 72/0453
370/329
(Continued)

FOREIGN PATENT DOCUMENTS

KR 10-2019-0028336 3/2019
KR 10-2019-0028336 A 3/2019
KR 10-2019-0083707 A 7/2019

OTHER PUBLICATIONS

3GPP TSG RAN WG1 NR Ad-Hoc#2, Jun. 27-30, 2017, R1-1710442.
(Continued)

*Primary Examiner* — Wei Zhao
(74) *Attorney, Agent, or Firm* — Kile Park Reed & Houtteman PLLC

(57) ABSTRACT

Provided are a repetitive transmission method for ultra-low latency and highly-reliable communication in a wireless communication system, and an apparatus therefor. A method for transmitting data by a terminal according to an embodiment of the present invention comprises the steps of: receiving information on the repetition number of transmission for a physical uplink shared channel (PUSCH) from a base station; receiving, from the base station, information on frequency hopping applied to the the PUSCH repetition configuring the the PUSCH repetition; determining a frequency resource for the PUSCH repetition based on the information on the frequency hopping; and performing the the PUSCH repetition.

24 Claims, 23 Drawing Sheets

(30) Foreign Application Priority Data

Aug. 9, 2019 (KR) .................. 10-2019-0097248
Dec. 17, 2019 (KR) .................. 10-2019-0169079
Dec. 17, 2019 (KR) .................. 10-2019-0169080
Dec. 20, 2019 (KR) .................. 10-2019-0172420

(58) Field of Classification Search
CPC ........ H04W 24/08; H04W 52/36; H04L 1/08; H04L 5/0012; H04L 5/0064
See application file for complete search history.

(56) References Cited

U.S. PATENT DOCUMENTS

| | | |
|---|---|---|
| 2018/0145813 A1 | 5/2018 | Yi et al. |
| 2019/0082456 A1 | 3/2019 | Kim et al. |
| 2019/0281588 A1* | 9/2019 | Zhang .................. H04L 5/0051 |

OTHER PUBLICATIONS

3GPP TSG RAN WG1 Meeting #90bis, Prague, Czech Republic, Oct. 9-13, 2017, R1-1718459.
3GPP TSG RAN WG1 Meeting #90bis, Prague, Czech Republic, Oct. 9-13, 2017, R1-1717110.
3GPP TSG-RAN WG1 Meeting #92bis, Sanya, P.R. China, Apr. 16-20, 2018, R1-1804587.
3GPP TSG RAN WG1 #97, Reno, USA, May 13-17, 2019, R1-1906213.
3GPP TSG RAN WG1 Meeting #92bis, Sanya, China, Apr. 16-20, 2018, R1-1804341.
3GPP TSG RAN WG1 #97, Reno, USA, May 13-17, 2019, R1-1906148.
"PUSCH enhancements for URLLC", 3GPP Draft R1-1906148, 3GPP TSG RAN WG1 #97, Reno, USA, May 13-17, 2019.
NTT Docomo, Inc, "PUSCH enhancements for URLLC" 3GPP Draft R1-1906213 3GPP TSG RAN, WG1 #97 Reno, USA, May 13-17, 2019.

* cited by examiner

FIG. 17

| TB | | | | | | | |
|---|---|---|---|---|---|---|---|
| CB0 | CB1 | CB2 | CB3 | CB4 | CB5 | CB6 | CB7 |
| CBG0 ||| CBG1 ||| CBG2 ||

FIG. 18

```
PDSCH-ServingCellConfig ::= SEQUENCE {
    codeBlockGroupTransmission        SetupRelease { PDSCH-CodeBlockGroupTransmission } OPTIONAL,  -- Need M
    xOverhead                         ENUMERATED { xOh6, xOh12, xOh18 } OPTIONAL,  -- Need S
    nrofHARQ-ProcessesForPDSCH        ENUMERATED {n2, n4, n6, n10, n12, n16} OPTIONAL,  -- Need S
    pucch-Cell                        ServCellIndex OPTIONAL ,  -- Cond SCellAddOnly
    ...
}

PDSCH-CodeBlockGroupTransmission ::= SEQUENCE {
    maxCodeBlockGroupsPerTransportBlock    ENUMERATED {n2, n4, n6, n8},
    codeBlockGroupFlushIndicator           BOOLEAN,
    ...
}
```

FIG. 19

```
PUSCH-ServingCellConfig ::= SEQUENCE {
    codeBlockGroupTransmission     SetupRelease { PUSCH-CodeBlockGroupTransmission } OPTIONAL,  -- Need M
    rateMatching                   ENUMERATED { limitedBufferRM } OPTIONAL,  -- Need S
    xOverhead                      ENUMERATED { xoh6, xoh12, xoh18 } OPTIONAL,  -- Need S
    ...
}

PUSCH-CodeBlockGroupTransmission ::= SEQUENCE {
    maxCodeBlockGroupsPerTransportBlock     ENUMERATED {n2, n4, n6, n8},
    ...
}
```

DATA TRANSMISSION METHOD FOR ULTRA-LOW LATENCY AND HIGHLY-RELIABLE COMMUNICATION IN WIRELESS COMMUNICATION SYSTEM, AND APPARATUS THEREFOR

CROSS-REFERENCE TO RELATED APPLICATIONS

This application is a national stage of International Application No. PCT/KR2020/010313, filed on Aug. 5, 2020, which claims the benefit of priority to Korean Application(s) No. 10-2019-0097246, filed on Aug. 9, 2019 and 10-2019-0097247, filed on Aug. 9, 2019 and 10-2019-0097248, filed on Aug. 9, 2019 and 10-2019-0169079, filed on Dec. 17, 2019 and 10-2019-0169080, filed on Dec. 17, 2019 and 10-2019-0172420, filed on Dec. 20, 2019 in the Korean Intellectual Property Office, the disclosures of which are incorporated herein by reference.

BACKGROUND OF THE DISCLOSURE

Field of the disclosure

The present disclosure relates to a wireless communication system, and more specifically, to a data transmission method and apparatus for ultra-low latency and highly-reliable communication.

Related Art

For communication in various application fields corresponding to 5G Ultra-Reliable and Low Latency Communication (URLLC) scenarios, data needs to be transmitted rapidly and stably. However, when a terminal moves in a direction in which a channel deteriorates in an environment in which the terminal moves rapidly, an error may be generated in data, and thus a situation in which the corresponding data needs to be retransmitted may occur.

In the case of normal data transmission, there is no problem even if data is retransmitted. However, in the case of transmitting URLLC data, a problem of increased latency may occur if retransmission is performed.

SUMMARY

A technical object of the present disclosure to provide a method for repetitively transmitting data with stability and a short delay.

Another technical object of the present disclosure is to provide an apparatus for stably transmitting used data with a short delay.

Yet another technical object of the present disclosure is to provide a method for transmitting data based on a code block group (CBG) in a scenario such as URLLC in which the amount of data is relatively small and data needs to be stably transmitted with a short delay.

Still another technical object of the present disclosure is to provide an apparatus for transmitting data based on a CBG in a scenario such as URLLC in which the amount of data is relatively small and data needs to be stably transmitted with a short delay.

According to an aspect of the present disclosure, a method for transmitting data by a UE in a wireless communication system includes receiving downlink control information including information on a repetition number of transmission for uplink data and information on frequency hopping from a base station, configuring a plurality of physical uplink shared channels (PUSCHs) corresponding to the repetition number of transmission, the uplink data being equally mapped to the PUSCHs, and determining frequency resources for transmission of the PUSCHs based on the information on frequency hopping, wherein a range of the frequency hopping may change according to a size of a bandwidth part (BWP) activated for transmission of the uplink data.

According to an aspect, the uplink control information may further include information on a length of a mini-slot used for repetitive transmission of the uplink data, and the PUSCHs may be performed in units of the mini-slot.

According to another aspect, the frequency resources may be frequency resources corresponding to both ends of the activated bandwidth part.

According to another aspect, the method may further include transmitting channel quality information to the base station before the receiving step, wherein the information on frequency hopping may be determined based on the channel quality information.

According to another aspect, the information on frequency hopping includes information on whether the frequency hopping is applied and information on a frequency hopping pattern.

According to another aspect, the method may further include receiving, from the base station, information on a default repetition number of transmission for uplink transmission before the receiving step, wherein the downlink control information may include information on a difference between the default repetition number of transmission and an actual repetition number of transmission of the uplink data.

According to another aspect of the present disclosure, a method for receiving data by a base station in a wireless communication system includes determining whether to apply frequency hopping to uplink data of a UE based on channel quality information received from the UE, transmitting downlink control information including information on a repetition number of transmissions for the uplink data and information on the frequency hopping to the UE, and receiving, from the UE, a plurality of PUSCHs corresponding to the repetition number of transmission through frequency resources determined based on the information on the frequency hopping, wherein the uplink data is equally mapped to the plurality of PUSCHs, and a range of the frequency hopping may change according to a size of a bandwidth part activated in the UE for transmission of the uplink data.

According to another aspect of the present disclosure, a method for transmitting data by a base station in a wireless communication system includes transmitting, to a UE, a plurality of physical downlink shared channels (PDSCHs) to which first data is equally mapped, receiving a feedback for the plurality of PDSCHs from the UE, and determining a repetition number of transmission for second data based on the feedback.

According to one aspect, the method may further include transmitting, to the UE, a radio resource control (RRC) message including information on at least one of a maximum repetition number of transmission and a default repetition number of transmission for downlink data before the transmitting step, wherein the plurality of PDSCHs may be configured according to the maximum repetition number of transmission or the repetition default number transmission.

According to another aspect, the feedback may include ACK or NACK for each of the plurality of PDSCHs, and the repetition number of transmission for the second data may be determined based on at least one of the number of ACKs and the number of NACKs included in the feedback.

According to another aspect, the determining step may include changing the repetition number of transmission for the second data if the number of ACKs or NACKs included in the feedback is equal to or greater than a reference value or a ratio between the number of ACKs and the number of NACKs included in the feedback is equal to or greater than a reference ratio.

According to another aspect, the repetition number of transmission for the second data may be changed when a channel environment when the second data is transmitted corresponds to a channel environment when the first data is transmitted.

According to another aspect, the method may further include transmitting downlink control information including information on the repetition number of transmission for the second data to the UE after the determining step.

According to another aspect, the downlink control information may include information on a difference between the repetition number of transmission for the first data and the repetition number of transmission for the second data.

According to another aspect of the present disclosure, a method for transmitting data by a UE in a wireless communication system includes configuring a plurality of physical uplink shared channels (PUSCHs) to which first data is equally mapped and transmitting the PUSCHs to a base station, receiving a feedback for the plurality of PUSCHs from the base station, receiving information on a repetition number of transmissions determined based on the feedback from the base station, and performing repetition of second data based on the information on the repetition number of transmission.

According to another aspect of the present disclosure, a method for transmitting data by a UE in a wireless communication system includes receiving a feedback for uplink data transmitted by the UE from a base station, determining whether to perform retransmission of the uplink data based on the feedback, setting a size of a code block group of the uplink data based on a type of the uplink data when the uplink data is retransmitted, and retransmitting the uplink data in units of the adjusted code block group.

According to one aspect, the uplink data may include URLLC (Ultra-Reliable and Low Latency Communication) data, and the size of the code block group may be set to be less than the size of a code block group for retransmission of enhanced mobile broadband (eMBB) data.

According to another aspect, the method may further include, before the receiving step, receiving information on the size of a code block group for retransmission of the URLLC data from the base station through at least one of a radio resource control (RRC) message and downlink control information.

According to another aspect, the information on the size of the code block group may be information on a maximum number of code block groups per transport block for the URLLC data.

According to another aspect, the maximum number of code block groups per transport block for the URLLC data may be set separately from a maximum number of code block groups per transport block for the eMBB data.

According to another aspect of the present disclosure, a method for transmitting data by a base station in a wireless communication system may include receiving a feedback for downlink data transmitted by the base station from a UE, determining whether to perform retransmission of the downlink data based on the feedback, setting a size of a code block group of the downlink data based on a type of the downlink data when the downlink data is retransmitted, and retransmitting the downlink in units of the adjusted code block group.

According to another aspect of the present disclosure, a method for transmitting data by a UE in a wireless communication system is provided. The data transmission method includes receiving information on a repetition number of transmission for a physical uplink shared channel (PUSCH) from a base station, receiving information on frequency hopping applied to the PUSCH repetition from the base station, configuring the PUSCH repetition, determining frequency resources for the PUSCH repetition based on the information on the frequency hopping, and performing the PUSCH repetition.

According to another aspect of the present disclosure, a range of the frequency hopping is changed according to a size of a bandwidth part (BWP) activated for the PUSCH repetition.

According to another aspect of the present disclosure, the method may further include receiving information on a length of a mini-slot used for the PUSCH repetition, wherein the PUSCH repetition is performed in units of the mini-slot.

According to another aspect of the present disclosure, the frequency resources are frequency resources corresponding to both ends of the activated bandwidth part.

According to another aspect of the present disclosure, the data transmission method further includes transmitting channel quality information to the base station, wherein the information on the frequency hopping is determined based on the channel quality information.

According to another aspect of the present disclosure, the information on the frequency hopping includes information on whether the frequency hopping is applied and information on a frequency hopping pattern.

According to another aspect of the present disclosure, the information on the repetition number of transmission includes information on a default repetition number of transmission and information on a difference between the default repetition number of transmission and an actual number of times of the PUSCH repetition.

According to another aspect of the present disclosure, the information on the repetition number of transmission includes at least one of a maximum repetition number of transmission and the default repetition number of transmission as a radio resource control (RRC) message, wherein the PUSCH repetition is configured according to the maximum repetition number of transmission or the default repetition number of transmission.

According to another aspect of the present disclosure, the data transmission method further includes receiving, from the base station, information on a repetition number of new transmission determined based on ACK or NACK for the PUSCH repetition and performing transmission of a new PUSCH based on the information on the repetition number of new transmission.

According to another aspect of the present disclosure, the information on the repetition number of new transmission is changed if the number of ACKs or NACKs is equal to or greater than a reference value or a ratio between the number of ACKs and the number of NACKs is equal to or greater than a reference ratio.

According to another aspect of the present disclosure, a method for transmitting data by a base station in a wireless communication system is provided. The data transmission method includes transmitting information on a repetition number of transmission for a physical downlink shared channel (PDSCH) to a UE, transmitting information on frequency hopping applied to the PUSCH repetition to the UE, configuring the PDSCH repetition, determining frequency resources for the PDSCH repetition based on the information on the frequency hopping, and performing the PDSCH repetition.

According to another aspect of the present disclosure, a range of the frequency hopping is changed according to a size of a bandwidth part (BWP) activated for the PDSCH repetition.

According to another aspect of the present disclosure, the data transmission method further includes transmitting information on a length of a mini-slot used for the PDSCH repetition to the UE, wherein repetition transmission of the PDSCH is performed in units of the mini-slot.

According to another aspect of the present disclosure, the frequency resources are frequency resources corresponding to both ends of the activated bandwidth part.

According to another aspect of the present disclosure, the data transmission method further includes receiving channel quality information from the UE, wherein the information on the frequency hopping is determined based on the channel quality information.

According to another aspect of the present disclosure, the information on the frequency hopping includes information on whether the frequency hopping is applied and information on a frequency hopping pattern.

According to another aspect of the present disclosure, the information on the repetition number of transmission includes information on a default repetition number of transmission and information on a difference between the default repetition number of transmission and an actual number of times of the PDSCH repetition.

According to another aspect of the present disclosure, the information on the repetition number of transmissions includes at least one of a maximum repetition number of transmission and a default repetition number of transmission as an RRC message, wherein the PDSCH repetition is configured according to the maximum repetition number of transmission or the default repetition number of transmission.

According to another aspect of the present disclosure, the data transmission method includes transmitting information on a repetition number of new transmission determined based on ACK or NACK for the PDSCH repetition to the UE and performing a new PDSCH repetition based on the repetition number of new transmission.

According to another aspect of the present disclosure, the information on the repetition number of new transmission is changed if the number of ACKs or NACKs is equal to or greater than a reference value or a ratio between the number of ACKs and the number of NACKs is equal to or greater than a reference ratio.

Advantageous Effects

According to the present invention, when data corresponds to URLLC, a transmitter can transmit the same data twice or more using frequency hopping based on a mini-slot, and thus the data can be transmitted more rapidly and stably.

In addition, the repetition number of data transmission can be optimized, and thus overhead of HARQ feedback can be reduced.

Furthermore, when URLLC data is retransmitted according to HARQ, a time delay can be reduced and retransmission may be performed more efficiently in terms of resource allocation and resource utilization required for transmission.

BRIEF DESCRIPTION OF THE DRAWINGS

FIG. 17 is a diagram for describing the concept of a code block group applied to the present disclosure.

FIG. 18 illustrates a configuration of a PDSCH serving cell applied to an embodiment of the present disclosure.

FIG. 19 illustrates a configuration of a PUSCH serving cell applied to an embodiment of the present disclosure.

DESCRIPTION OF EXEMPLARY EMBODIMENTS

Figure 1:
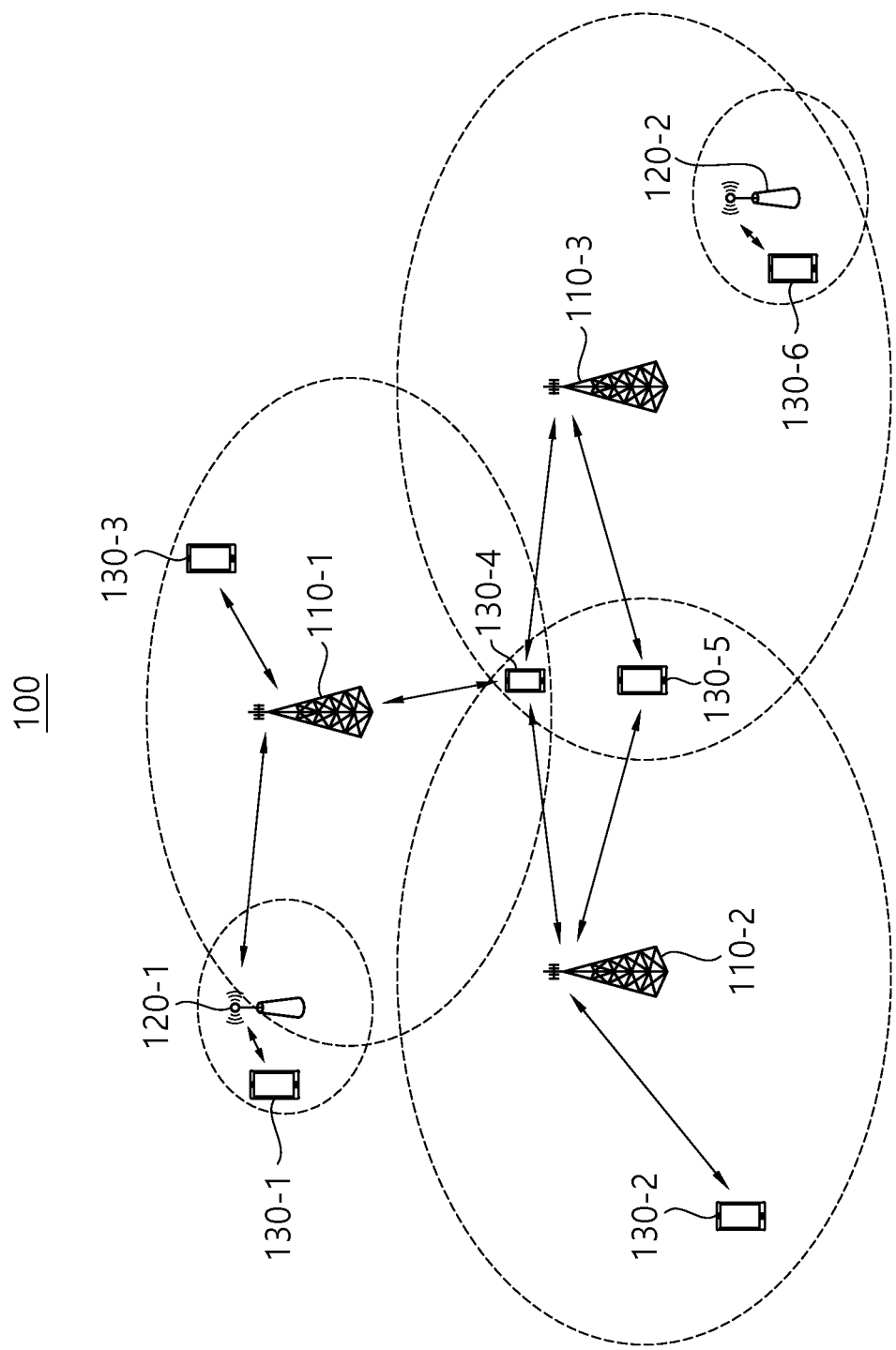
FIG. 1 is a conceptual diagram illustrating a wireless communication system according to an embodiment of the present disclosure.

The present disclosure can be modified in various manners and can have various embodiments, and specific embodiments are illustrated in the drawings and described in detail in the detailed description. However, this is not intended to limit the present disclosure to specific embodiments and the present disclosure includes all modifications, equivalents and substitutions included in the spirit and scope of the present invention. In the drawings, like reference numerals are used for like elements.

While terms, such as "first", "second", "A", "B", etc. may be used to describe various components, such components must not be limited by the above terms. The above terms are used only to distinguish one component from another. For example, a first component may be referred to as a second component, and similarly, the second component may also be referred to as the first component without departing from the scope of the present disclosure. The term "and/or" includes combinations of a plurality of related items or any of a plurality of related items.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The terms used in the present disclosure are only used to describe specific embodiments, and are not intended to limit the present invention. The singular expression includes the plural expression unless the context clearly dictates otherwise. In the present disclosure, terms such as "comprise" or "have" are intended to designate that a feature, number, step, operation, component, part, or combination thereof described in the specification exists, but it is to be understood that this does not preclude the possibility of addition or existence of numbers, steps, operations, components, parts, or combinations thereof.

All the terms that are technical, scientific or otherwise agree with the meanings as understood by a person skilled in the art unless defined to the contrary. Common terms as found in dictionaries should be interpreted in the context of the related technical writings not too ideally or impractically unless this disclosure expressly defines them so.

Hereinafter, preferred embodiments according to the present disclosure will be described in detail with reference to the accompanying drawings.

FIG. 1 is a conceptual diagram illustrating a wireless communication system according to an embodiment of the present disclosure.

Referring to FIG. 1, a wireless communication system 100 may include a plurality of communication nodes 110-1, 110-2, 110-3, 120-1, 120-2, 130-1, 130-2, 130-3, 130-4, 130-5, and 130-6.

Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier (SC)-FDMA based communication protocol, a non-orthogonal multiplexing access (NOMA) based communication protocol, a space division multiple access (SDMA) based communication protocol, and the like.

The wireless communication system 100 includes a plurality of base stations 110-1, 110-2, 110-3, 120-1, and 120-2 and a plurality of user equipments (UEs) 130-1, 130-2, 130-3, 130-4, 130-5, and 130-6.

Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may belong to the coverage of the first base station 110-1. The second UE 130-2, the fourth UE 130-4, and the fifth UE 130-5 may belong to the coverage of the second base station 110-2. The fifth base station 120-2, the fourth UE 130-4, the fifth UE 130-5, and the sixth UE 130-6 may belong to the coverage of the third base station 110-3. The first UE 130-1 may belong to the coverage of the fourth base station 120-1. The sixth UE 130-6 may belong to the coverage of the fifth base station 120-2.

Here, each of the plurality of base stations 110-1, 110-2, 110-3, 120-1, and 120-2 may be referred to as a NodeB, an evolved NodeB, a next generation Node B (gNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, and the like. Each of the plurality of terminals 130-1, 130-2, 130-3, 130-4, 130-5, and 130-6 may be referred to as a terminal, an access terminal, a mobile terminal, a station, a subscriber station, a mobile station, a portable subscriber station, a node, a device, and the like.

Each of the plurality of communication nodes 110-1, 110-2, 110-3, 120-1, 120-2, 130-1, 130-2, 130-3, 130-4, 130-5, and 130-6 may support cellular communication (e.g., long term evolution (LTE), LTE-advanced (LTE-A), new radio (NR), etc. defined in 3rd generation partnership project (3GPP) standards). The plurality of base stations 110-1, 110-2, 110-3, 120-1, and 120-2 may operate in different frequency bands or may operate in the same frequency band. The plurality of base stations 110-1, 110-2, 110-3, 120-1, and 120-2 may be connected to each other through an ideal backhaul or a non-ideal backhaul and exchange information through the ideal backhaul or the non-ideal backhaul. The plurality of base stations 110-1, 110-2, 110-3, 120-1, and 120-2 may be connected to a core network (not shown) through an ideal backhaul or a non-ideal backhaul. The plurality of base stations 110-1, 110-2, 110-3, 120-1, and 120-2 may transmit a signal received from the core network to the corresponding terminals 130-1, 130-2, 130-3, 130-4, 130-5, and 130-6) and transmit signals received from the corresponding terminals 130-1, 130-2, 130-3, 130-4, 130-5 and 130-6 to the core network.

Each of the plurality of base stations 110-1, 110-2, 110-3, 120-1, and 120-2 may support OFDMA based downlink transmission and OFDMA or SC-FDMA based uplink transmission. In addition, each of the plurality of base stations 110-1, 110-2, 110-3, 120-1, and 120-2 may support multiple input multiple output (MIMO) transmission (e.g., single user (SU)-MIMO, multi-user (MU)-MIMO, massive MIMO, etc.), coordinated multipoint (CoMP) transmission, carrier aggregation transmission, transmission in an unlicensed band, device-to-device (D2D) communication (or proximity services (ProSe)), etc. Here, the plurality of UEs 130-1, 130-2, 130-3, 130-4, 130-5, and 130-6 can perform operations corresponding to the base stations 110-1, 110-2, 110-3, 120-1, and 120-2 and/or operations supported by the base stations 110-1, 110-2, 110-3, 120-1, and 120-2.

For example, the second base station 110-2 may transmit a signal to the fourth UE 130-4 according to SU-MIMO, and the fourth UE 130-4 may receive the signal from the second base station 110-2 according to SU-MIMO. Alternatively, the second base station 110-2 may transmit a signal to the fourth UE 130-4 and the fifth UE 130-5 according to MU-MIMO, and the fourth UE 130-4 and the fifth UE 130-5 may receive the signal from the second base station 110-2 according to MU-MIMO. The first base station 110-1, the second base station 110-2, and the third base station 110-3 may transmit signals to the fourth UE 130-4 according to CoMP, and the fourth UTE 130-4 may receive the signals from the first base station 110-1, the second base station 110-2, and the third base station 110-3 according to CoMP. The plurality of base stations 110-1, 110-2, 110-3, 120-1, and 120-2 may transmit/receive signals to/from the UEs 130-1, 130-2, 130-3, 130-4, 130-5, and 130-6 belonging to the coverages thereof according to CA.

Each of the first base station 110-1, the second base station 110-2, and the third base station 110-3 may coordinate D2D communication between the fourth UE 130-4 and the fifth UE 130-5, and the fourth UE 130-4 and the fifth UE 130-5 may perform D2D communication according to coordination of the second base station 110-2 and the third base station 110-3.

Hereinafter, even when a method (e.g., transmission or reception of a signal) performed in a first communication node among communication nodes is described, a second communication node corresponding thereto may perform a method (e.g., reception or transmission of a signal) corresponding to the method performed in the first communication node. That is, when the operation of a UE is described, the corresponding base station may perform an operation corresponding to the operation of the UE. On the other hand, when the operation of a base station is described, the corresponding UE may perform an operation corresponding to the operation of the base station.

Hereinafter, downlink (DL) means communication from a base station to a UE, and uplink (UL) means communication from a UE to a base station. On downlink, a transmitter may be a part of a base station and a receiver may be a part of a UE. On uplink, the transmitter may be a part of the UE and the receiver may be a part of the base station.

Recently, the amount of information exchanged through a communication network has increased with rapid spread of smartphones and Internet of Things (IoT) terminals. Accordingly, in the next-generation wireless access technology, an environment (e.g., enhanced mobile broadband communication) in which faster services are provided to more users than conventional communication systems (or conventional radio access technology) needs to be considered. To this end, design of a communication system in consideration of machine type communication (MTC) providing services by connecting a plurality of devices and objects is under discussion. In addition, design of a communication system (e.g., URLLC) considering services and/or terminals sensitive to reliability and/or latency of communication is also under discussion.

Hereinafter, for convenience of description, the next-generation radio access technology is referred to as new radio access technology (RAT) and a wireless communication system to which the New RAT is applied is referred to as a new radio (NR) system in this description.

Figure 2:
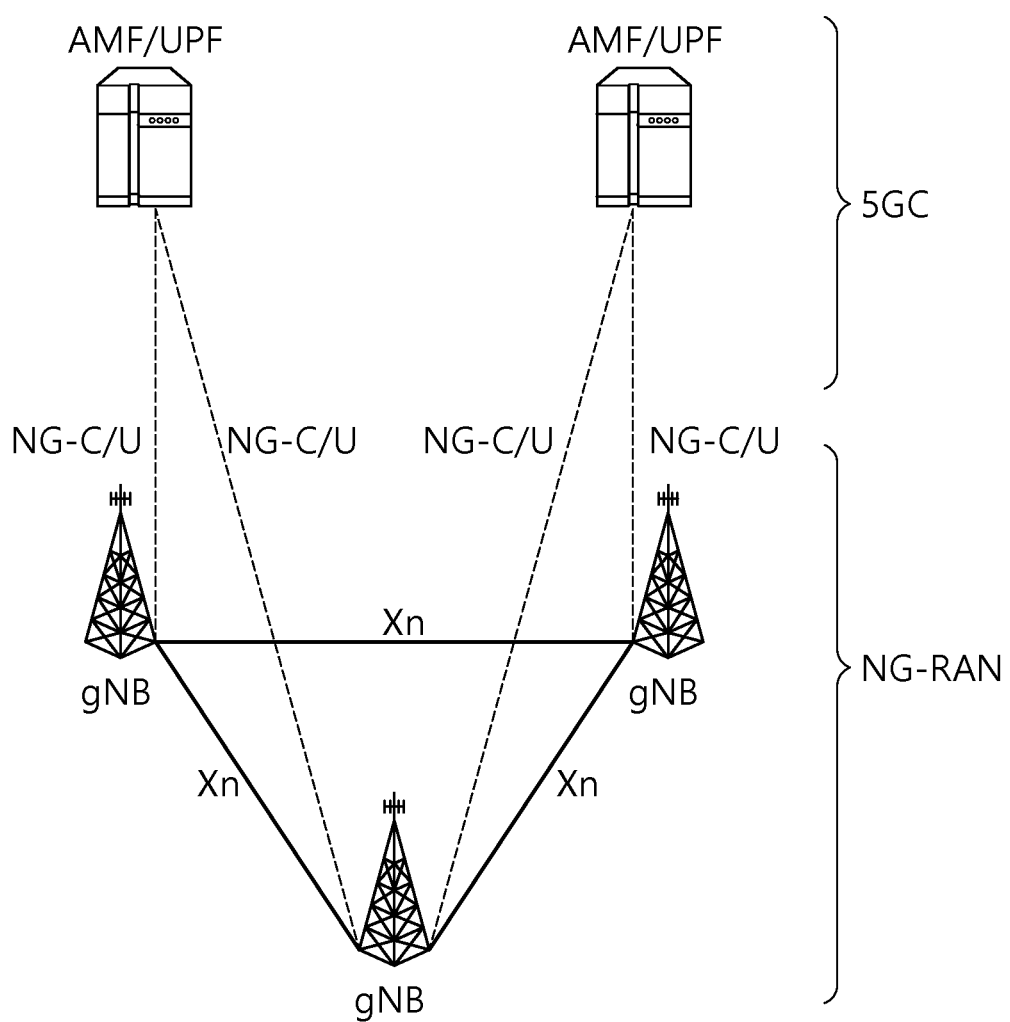
FIG. 2 is an exemplary diagram illustrating an NR system to which a data transmission method according to an embodiment of the present disclosure is applicable.

FIG. 2 is an exemplary diagram illustrating an NR system to which a data transmission method according to an embodiment of the present disclosure is applicable.

Referring to FIG. 2, the next generation-radio access network (NG-RAN) is composed of gNBs that provide a control plane (RRC) protocol termination for an NG-RA user plane (SDAP/PDCP/RLC/MAC/PHY) and UEs. (NG-RAN may also include an eNB which is an existing LTE base station.) Here, NG-C represents a control plane interface used for an NG2 reference point between the NG-RAN and a 5-generation core (5GC). NG-U represents a user plane interface used for an NG3 reference point between the NG-RAN and the SGC.

gNBs are interconnected through an Xn interface and connected to the 5GC through an NG interface. More specifically, the gNBs are connected to an access and mobility management function (AMF) through the NG-C interface and connected to a user plane function (UPF) through the NG-U interface.

In the NR system of FIG. 2, multiple numerologies may be supported. Here, a numerology may be defined by a subcarrier spacing (SCS) and a cyclic prefix (CP) overhead. Here, a plurality of subcarrier spacings may be derived by scaling a basic subcarrier spacing by an integer. Further, a numerology to be used may be selected independently of a frequency band although it is assumed that a very low subcarrier spacing is not used at a very high carrier frequency.

In addition, in the NR system, various frame structures according to a number of numerologies may be supported. Hereinafter, an OFDM numerology and a frame structure used in a data transmission method according to an embodiment of the present disclosure will be described with reference to FIG. 3.

Figure 3:
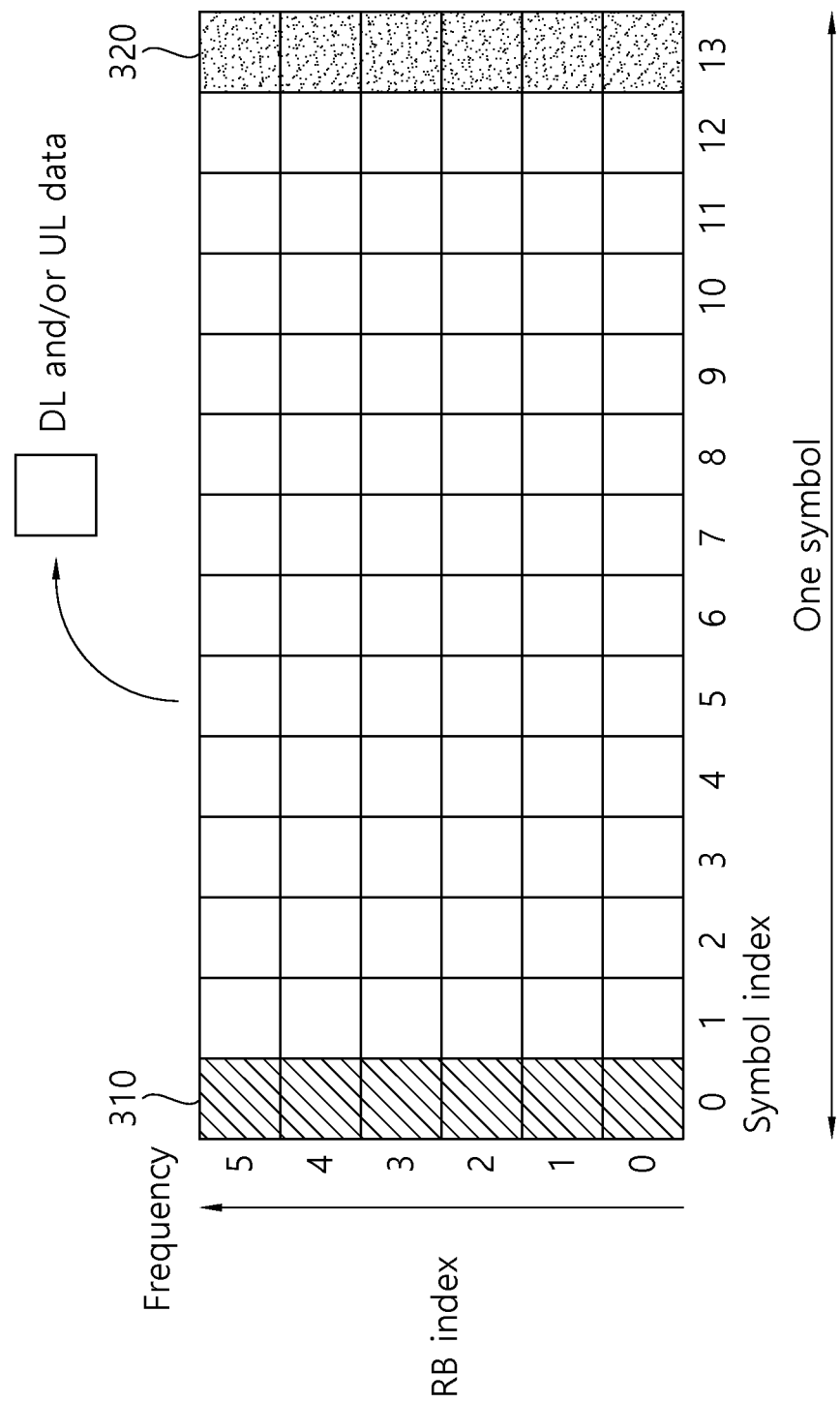
FIG. 3 is a diagram illustrating a slot structure used in the data transmission method according to an embodiment of the present disclosure.

FIG. 3 is a diagram illustrating a slot structure used in a data transmission method according to an embodiment of the present disclosure.

A time division duplexing (TDD) considered in the NR system is a structure in which both uplink (UL) and downlink (DL) are processed in one slot (or subframe). This is for the purpose of minimizing the latency of data transmission in a TDD system and may be referred to as a self-contained structure or a self-contained slot.

Referring to FIG. 3, one slot may include 14 OFDM symbols (12 OFDM symbols in case of using extended CP. In FIG. 3, a region 310 indicates a downlink control region and region 320 indicates an uplink control region. Here, unlike shown in FIG. 3, the number of symbols used for the downlink and uplink control regions in one slot may be greater than one. Regions (that is, regions without indications) other than the regions 310 and 320 may be used for transmission of downlink data or uplink data. That is, uplink control information and downlink control information may be transmitted in one slot. Further, in the case of data, uplink data and downlink data may be transmitted in one slot.

When the structure shown in FIG. 3 is used, downlink transmission and uplink transmission are sequentially performed within one slot, and transmission of downlink data and reception of uplink ACK/NACK may be performed. Accordingly, when an error is generated in data transmission, a time required for data retransmission can be reduced. In this manner, a delay associated with data transmission can be minimized.

In the slot structure as shown in FIG. 3, a time gap is required for a process in which a base station and/or a UE switch from a transmission mode to a reception mode or switch from the reception mode to the transmission mode. With respect to the time gap, some OFDM symbols may be set as a guard period (GP) when uplink transmission is performed after downlink transmission in the slot.

Figure 4:
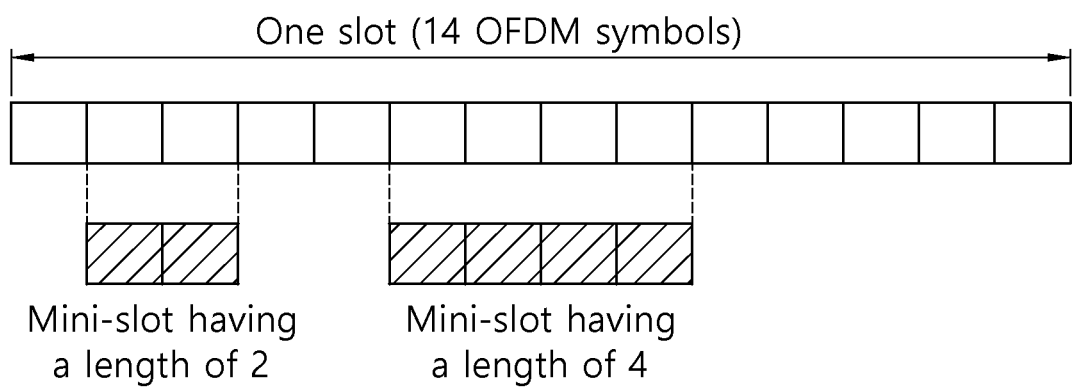
FIG. 4 is a diagram for describing a mini-slot used in the data transmission method according to an embodiment of the present disclosure.

FIG. 4 is a diagram for describing a mini-slot used in the data transmission method according to an embodiment of the present disclosure.

According to an embodiment of the present disclosure, in addition to slot-based scheduling for efficient support of URLLC, mini-slot-based scheduling may also be supported. (A mini-slot-based transmission method is also called a non-slot transmission method.) A mini-slot is a minimum scheduling unit by a base station and can be transmitted in units smaller than a slot (1 to 13 symbols). For example, a mini-slot may be composed of 2, 4, or 7 OFDM symbols.

A mini-slot can be started in any OFDM symbol in a slot as shown in FIG. 4. Although FIG. 4 shows two mini-slots having different lengths (the number of OFDM symbols) in one slot, this is for illustrative purposes only, and when a plurality of mini-slots are included in one slot, the mini-slots may have the same number of OFDM symbols.

In the NR system, data needs to be transmitted stably and rapidly with almost no errors for communication in various application fields corresponding to V2X (Vehicle to Everything) and URLLC scenarios. In particular, when a UE moves in a direction in which a channel deteriorates in an environment in which the UE moves rapidly, an error may occur when a base station sets a transmission format and transmits data based on CQI fed back from the UE to the base station, which may cause retransmission to be highly likely to occur. In case of transmitting general data such as enhanced mobile broadband (eMBB) data, there is no problem even if retransmission occurs. However, in the case of URLLC data, a problem may be generated due to a latency caused by retransmission when retransmission occurs. In V2X scenarios, URLLC scenarios, and the like, in most cases, the amount of transmitted user data is not large, and thus using of some additional resources may not be a big burden. Rather, if an error occurs and a delay increases due to retransmission caused by the error, this may be worse. Therefore, in the present disclosure, the same data can be repetitively or redundantly transmitted or duplicated in the following method. The data transmission method according to the present disclosure can be applied to various scenarios of URLLC as well as vehicle communication such as V2X.

Hereinafter, resource allocation in the NR system will be described.

In the NR system, a specific number (e.g., a maximum of 4 for each of downlink and uplink) of bandwidth parts (BWPs) may be defined. A BWP (or carrier BWP) is a set of consecutive PRBs and may be represented as consecutive subsets of common RBs (CRBs). Each RB in a CRB may start with CRB0 and may be represented by CRB1, CRB2, and the like.

<Repetitive Transmission Method Using Frequency Hopping and Apparatus Therefor>

Figure 5:
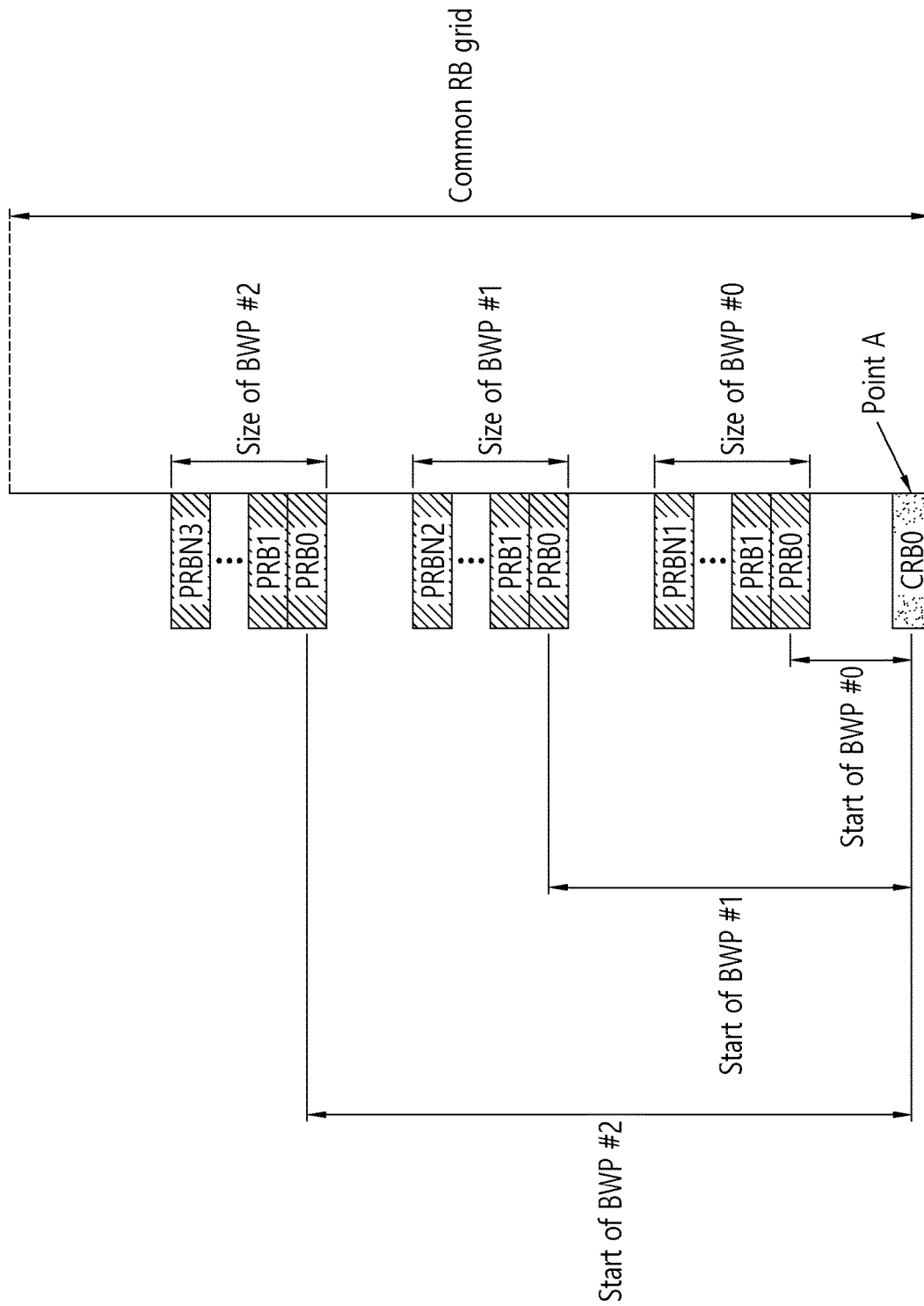
FIG. 5 is a diagram illustrating an example of a frequency allocation method and a BWP to which the technical features of the present disclosure are applicable.

FIG. 5 is a diagram illustrating an example of a frequency allocation method and BWPs to which the technical features of the present disclosure are applicable.

Referring to FIG. 5, a plurality of BWPs may be defined in a CRB grid. A reference point (which may be referred to as a common reference point, a starting point, or the like) of the CRB grid is called "point A" in NR. The point A is indicated by RMSI (i.e., SIB1). Specifically, a frequency offset between a frequency band in which an SS/PBCH block is transmitted and the point A may be indicated through the RMSI. The point A corresponds to the first subcarrier of CRB0 . In addition, the point A may be a point at which a variable "k" indicating a frequency band of an RE in NR is set to 0. The plurality of BWPs illustrated in FIG. 5 are configured as one cell (e.g., a primary cell (PCell)). The plurality of BWPs may be configured for each cell individually or in common.

Referring to FIG. 5, each BWP may be defined by a size and a starting point from CRB0 . For example, the first BWP, that is, BWP #0, may be defined by the starting point through an offset from CRB0 , and the size of BWP #1 may be determined through a size for BWP #0. BWPs may be defined to overlap within the entire channel bandwidth (CBW).

A specific number (e.g., a maximum of 4 for each of downlink and uplink) of BWPs may be configured for a UE. In the 3GPP Release 15 standard, even if a plurality of BWPs is configured, only a specific number (e.g., one) of BWPs can be activated for each cell for a given time. In the following standards, a plurality of BWPs may be activated for a given time. However, when a supplementary uplink (SUL) carrier is configured for a UE, up to 4 BWPs may be additionally configured in an SUL carrier, and one BWP may be activated for a given time. The number of configurable BWPs or the number of activated BWPs may be commonly or individually configured for UL and DL. In addition, the numerology and/or CP for a DL BWP, the numerology and/or the CP for a UL BWP may be configured in the UE through DL signaling. The UE may receive a PDSCH, a PDCCH, a channel state information (CSI) RS and/or a tracking RS (TRS) only in an active DL BWP. In addition, the UE may transmit a PUSCH and/or a physical uplink control channel (PUCCH) only in an active UL BWP.

Figure 6:
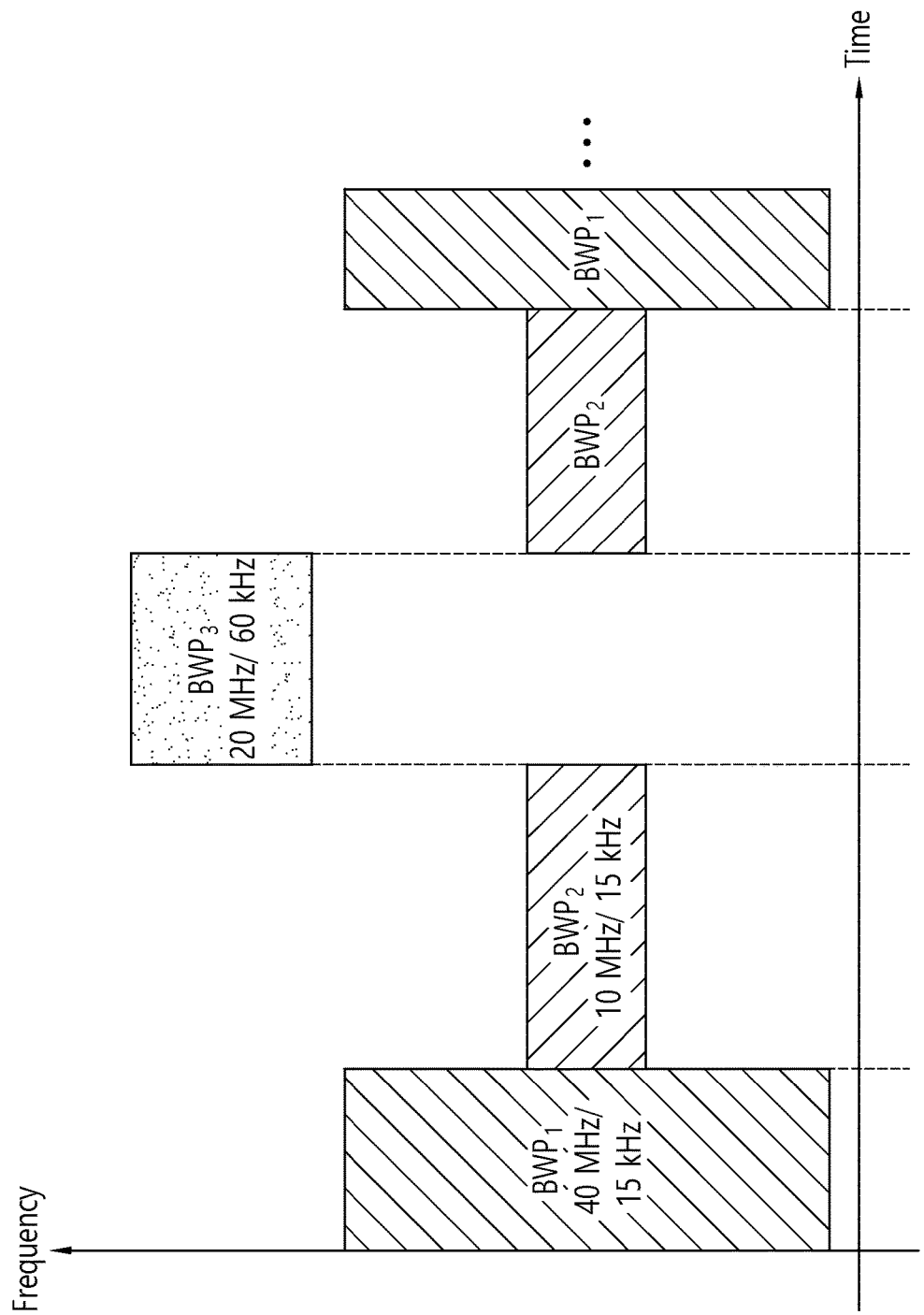
FIG. 6 is a diagram illustrating an example of a bandwidth adaptation method for transmitting multiple BWPs and BWPs while changing the same to which the technical features of the present disclosure are applicable.

FIG. 6 is a diagram illustrating an example of bandwidth adaptation in which multiple BWPs are used while being temporally changed to which the technical features of the present disclosure are applicable.

In FIG. 6, a situation in which 3 BWPs are configured is assumed. The first BWP may span a 40 MHz band and a subcarrier spacing of 15 kHz may be applied thereto. The second BWP may span a 10 MHz band and a subcarrier spacing of 15 kHz may be applied thereto. The third BWP may span a 20 MHz band and a subcarrier spacing of 60 kHz may be applied thereto. A UE may configure at least one of the 3 BWPs as an active BWP and may perform UL and/or DL data communication through the active BWP.

Time resources may be indicated in a manner of indicating a time difference/offset based on a transmission time of a PDCCH for DL or UL resource allocation. For example, a starting point of a PDSCH/PUSCH corresponding to the PDCCH and the number of symbols occupied by the PDSCH/PUSCH may be indicated.

In the NR system, carrier aggregation (CA) may be supported as in LTE/LTE-A. That is, it is possible to increase a bandwidth by aggregating consecutive or non-consecutive component carriers (CCs) and to increase a bit rate as a result. Each CC may correspond to a (serving) cell, and each CC/cell may be divided into a primary serving cell (PSC)/primary CC (PCC) or a secondary serving cell (SSC)/secondary CC (SCC).

In addition, single-beam and multi-beam forming can be supported in the NR system.

A network may deploy a single beam or multiple beams. Different beams may be used at different times. Regardless of whether a single beam or multiple beams are deployed, it may be necessary to indicate a resource to be monitored for control channel monitoring from the viewpoint of a UE. In particular, the same control channel may be transmitted multiple times when multiple beams are used or repetition is used from the viewpoint of a UE.

For communication in various application fields corresponding to V2X (Vehicle to Everything) and URLLC scenarios in the NR system, data to be transmitted needs to be transmitted stably and rapidly with almost no errors. In particular, if a UE moves in a direction in which a channel deteriorates in an environment in which the UE moves rapidly, an error may occur when a base station sets a transmission format and transmits data based on CQI fed back to from the UE to the base station, which may cause retransmission to be highly likely to occur. In case of transmitting general data such as eMBB data, there is no problem even if retransmission occurs. However, in the case of URLLC data, a problem may be generated due to a latency caused by retransmission if retransmission occurs. In V2X scenarios, URLLC scenarios, and the like, in most cases, the amount of transmitted user data is not large and thus using some additional resources may not be a big burden. Rather, if an error occurs and a delay increases due to retransmission caused by the error, this may be worse. Therefore, in the present disclosure, the same data can be repetitively or redundantly transmitted or duplicated through the following method. The data transmission method according to the present disclosure can be applied to various scenarios of URLLC as well as vehicle communication such as V2X.

FIG. 7 to FIG. 13 are flowcharts illustrating a frequency hopping method according to an embodiment of the present disclosure.

According to the present embodiment, when a transmitter redundantly or repetitively transmits the same information (same data) to a receiver, frequency hopping (FH) may be performed in the frequency domain. Here, when the transmitter is a UE, the receiver may be a base station or another UE. When the transmitter is a base station, the receiver may be a UE.

As an example, the UE may perform frequency hopping in the frequency domain in units of a mini-slot when repetitively or redundantly transmitting the same data to the base station. For example, after configuring a plurality of PUSCHs corresponding to the repetition number of transmission, the UE may transmit a first PUSCH to the base station in a first mini-slot using a first frequency and transmit a second PUSCH to the base station in a second mini-slot temporally adjacent to the first mini-slot using a second frequency according to frequency hopping. Here, the same uplink data may be equally mapped to each PUSCH.

As another example, the base station may perform frequency hopping in the frequency domain in units of a mini-slot when repetitively or redundantly transmitting the same data to the UE. For example, after configuring a plurality of PDSCHs corresponding to the repetition number of transmission, the base station may transmit a first PDSCH to the UE in a first mini-slot using a first frequency and transmit a second PUSCH to the UE in a second mini-slot temporally adjacent to the first mini-slot using a second frequency. Here, the same downlink data may be equally mapped to each PDSCH.

The present embodiment can be equally applied to a sidelink transmission environment.

In this case, the transmitter may be a transmitting UE and the receiver may be a receiving UE. Data transmitted through sidelink may be PSSCH or PSSCH data, or data related to URLLC.

In addition, in the present embodiment, the range of frequencies used for frequency hopping may vary according to the size of a bandwidth part (BWP). For example, a transmitter may use frequency resources corresponding to both ends of a BWP for FH in order to maximize the effect of frequency diversity. For example, as shown in FIG. 7, when a BWP is composed of 10 PRBs (PRB #0 to PRB #9) and 4 times of repetitive transmission are set, the transmitter may transmit the same data using PRB #0, which is the lowest frequency resource in the BWP, in first and third mini-slots and transmit the same data using PRB #9, which is the highest frequency resource in the BWP, in second and fourth mini-slots.

Figure 7:
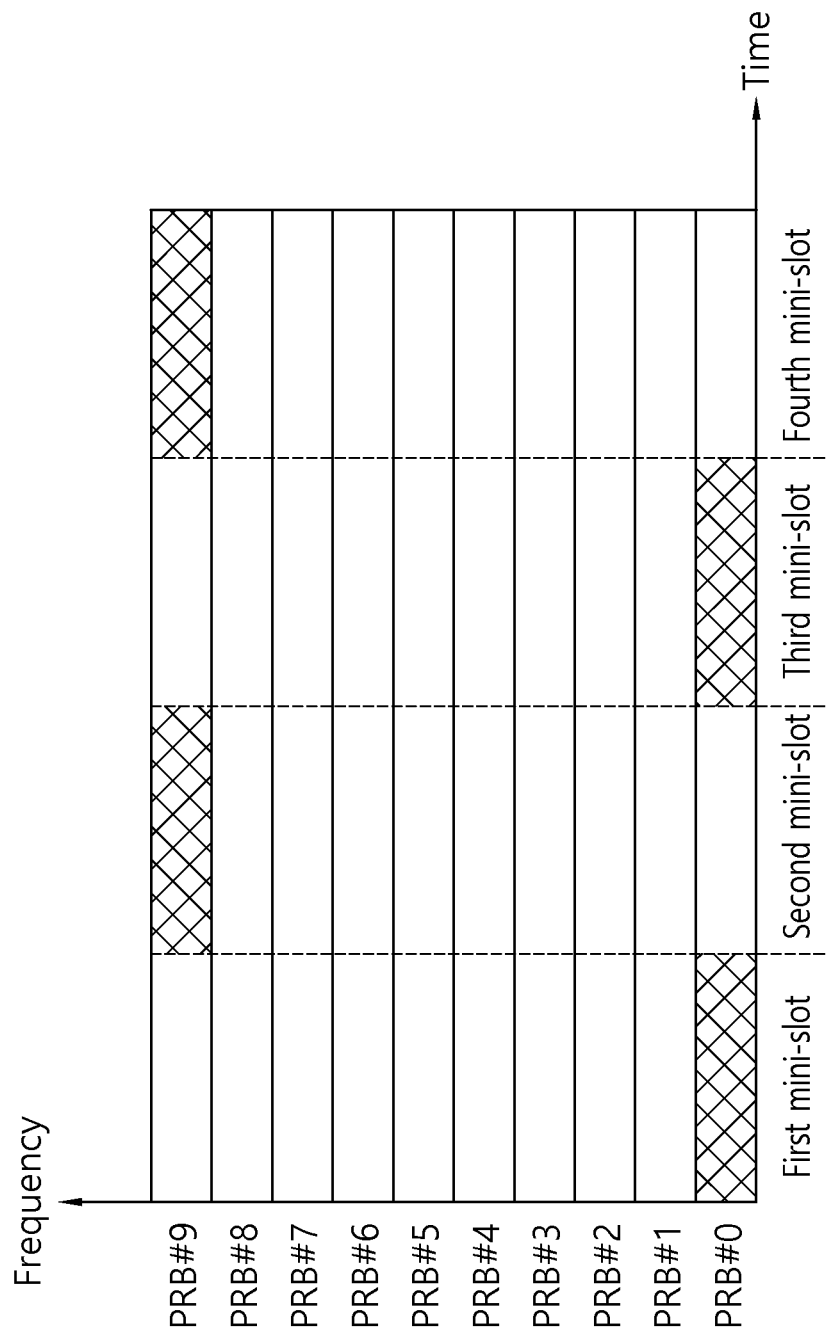
FIG. 7 to FIG. 13 are flowcharts showing a frequency hopping method according to an embodiment of the present disclosure.

Alternatively, the transmitter may transmit the same data using PRB #9 in the first and third mini-slots and transmit the same data using PRB #0 in the second and fourth mini-slots, unlike FIG. 7.

Figure 8:
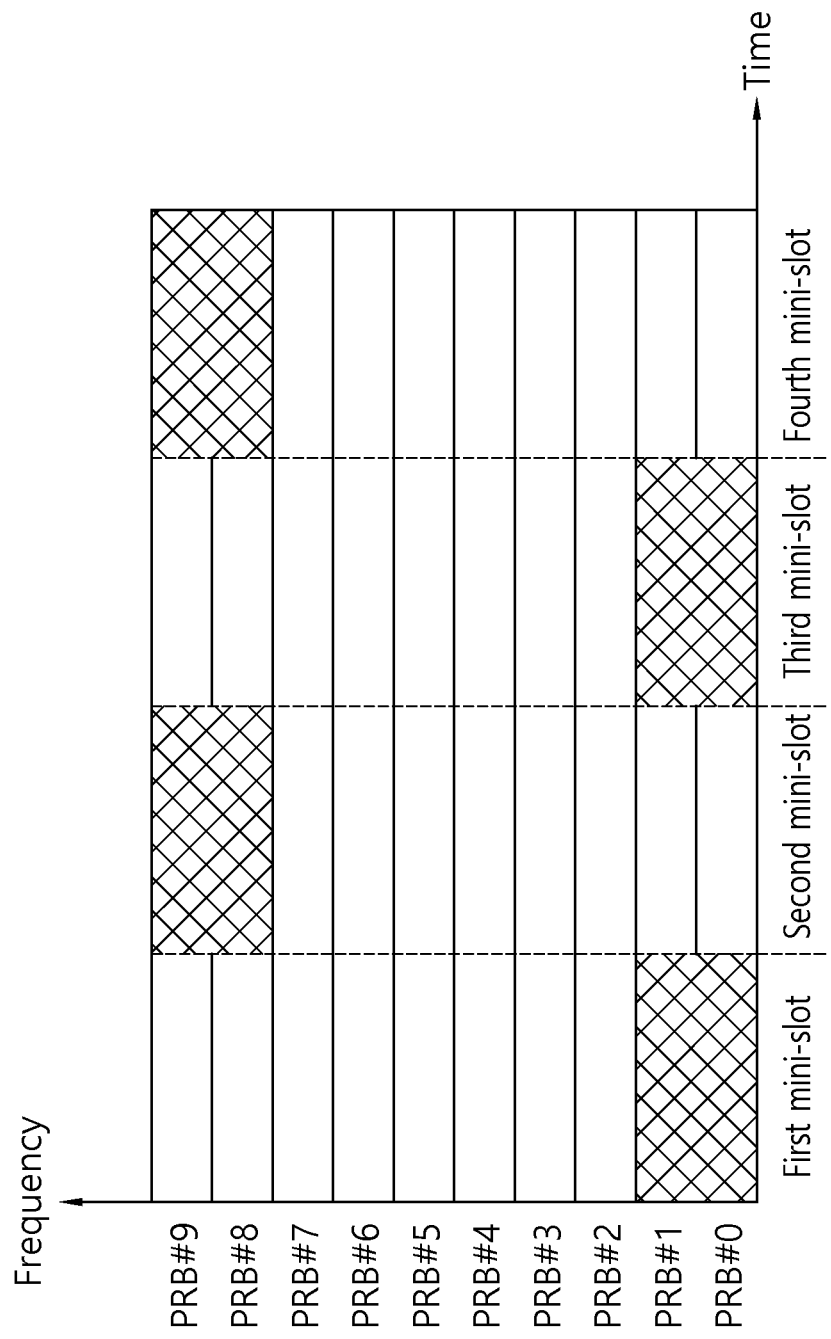

Meanwhile, when more frequency resources (resource Block (RB)) are necessary for data transmission, the transmitter may use multiple frequency resources while increasing the number of RBs from the end of the BWP. For example, in a situation where the BWP is composed of 10 PRBs (PRB #0 to PRB #9) and 4 times of repetitive transmission are set as shown in FIG. 8, the transmitter may transmit the same data using PRB #0 and PRB #1 in the first and third mini-slots and transmit the same data PRB #8 and PRB #9 in the second and fourth mini-slots. Alternatively, unlike FIG. 8, the transmitter may transmit the same data using PRB #8 and PRB #9 in the first and third mini-slots and transmit the same data using PRB #0 and PRB #1 in the second and fourth mini-slots.

Figure 9:
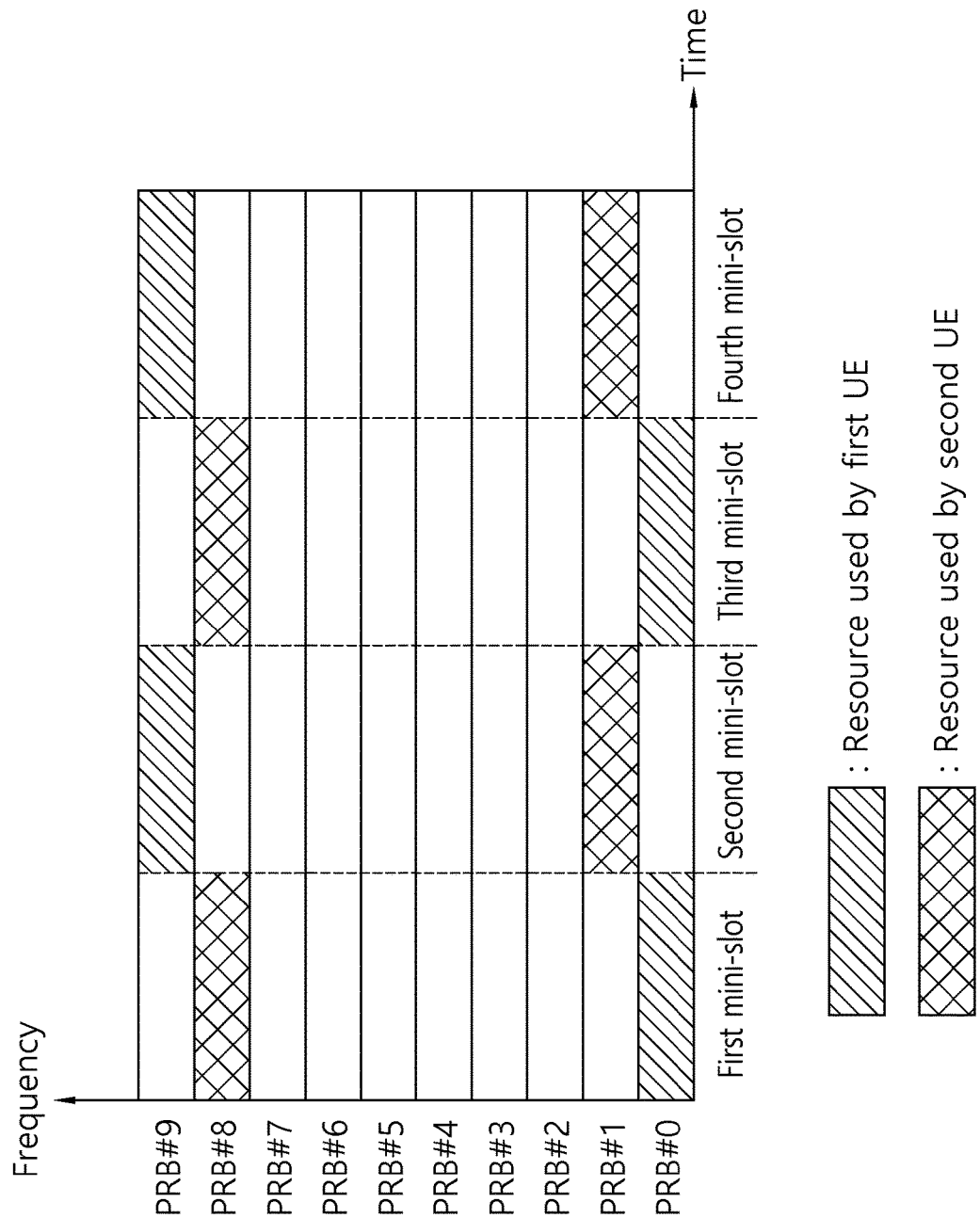
Figure 10:
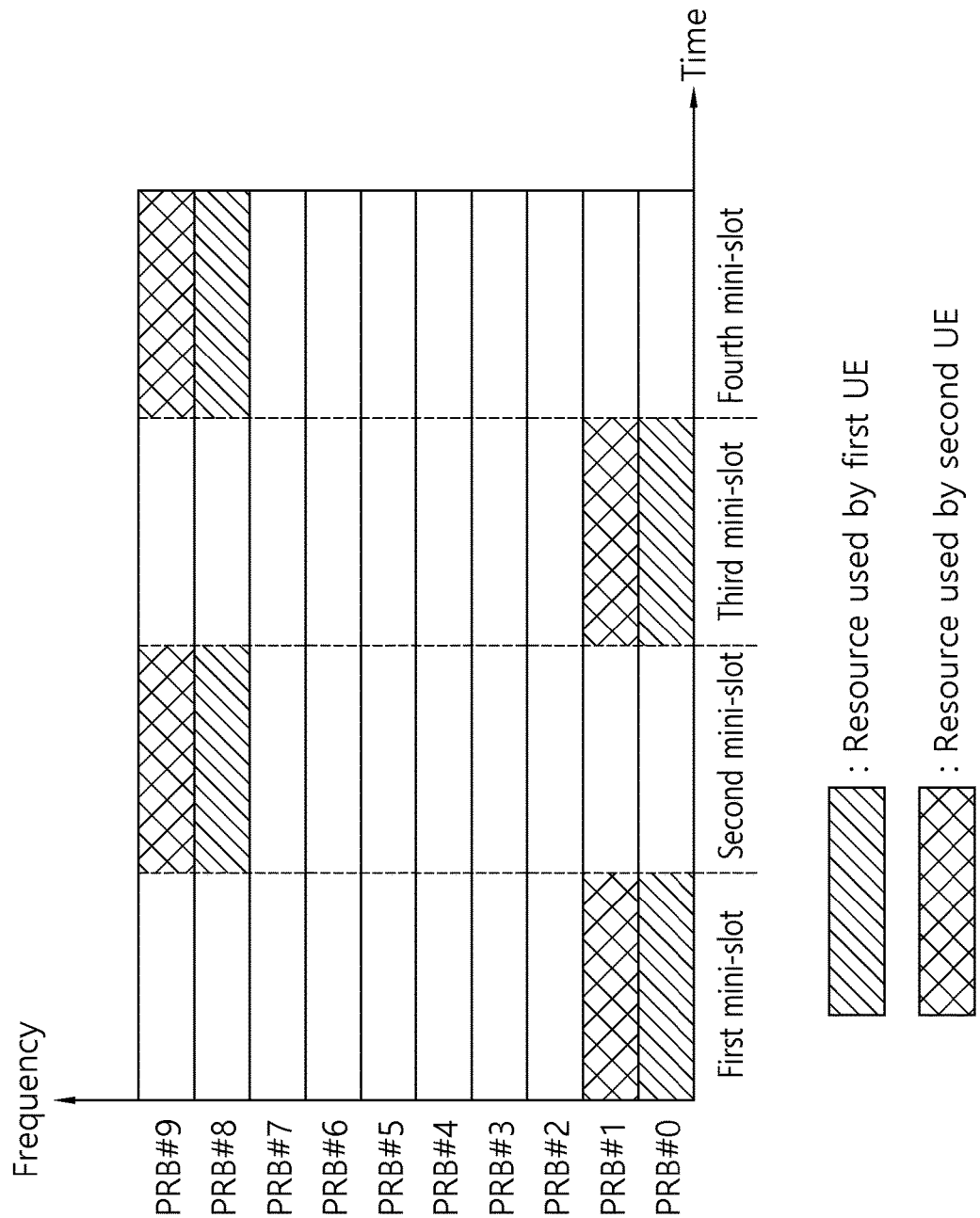
Figure 11:
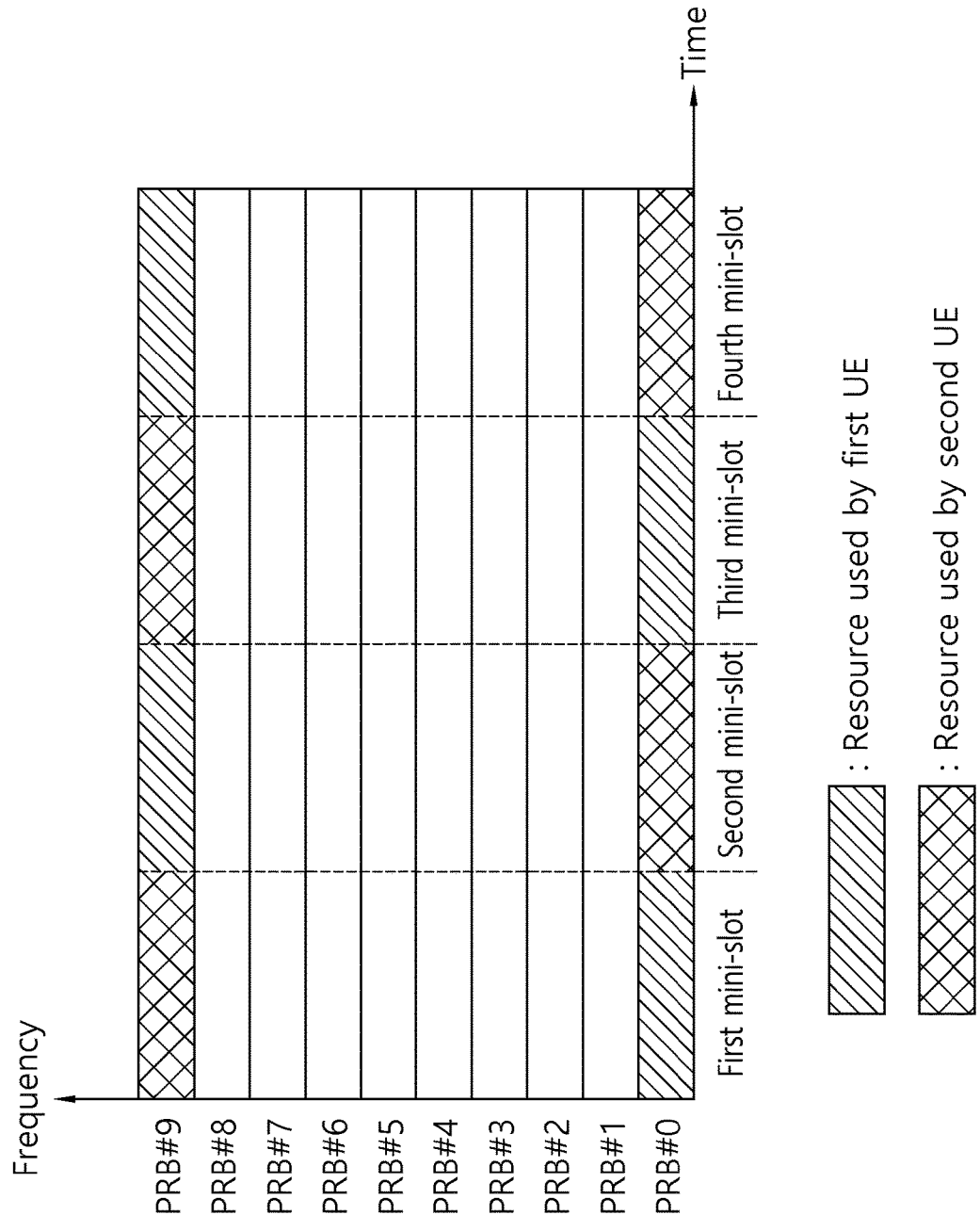

In addition, when there is a lot of URLLC traffic to which frequency hopping is applied, it is necessary to prevent collision of frequency resources. In particular, when resources to be used for frequency hopping overlap between multiple UEs, it is necessary to adjust a frequency hopping range to prevent collision of frequency resources. To this end, when frequency hopping is applied, the frequency resource at the end of a BWP may be basically used, but the frequency resource may be changed if necessary. For example, if repetition number is set to 4 for first and second UEs and frequency hopping resources of the first UE and frequency hopping resources of the second UE overlap, the first UE may repetitively transmit the same data using frequency hopping in units of a mini-slot based on PRB #0 and PRB #9, which are frequency resources that are basically set for frequency hopping, and the second UE may repetitively transmit the same data using frequency hopping in units of a mini-slot based on PRB #1 and PRB #8, which are inner frequency resources of basically set frequency resources, by adjusting the frequency hopping range within the BWP, as shown in FIG. 9. Alternatively, as shown in FIG. 10, both the first UE and the second UE may adjust the frequency hopping range, the first UE may repetitively transmit data using PRB #0 and PRB #8, and the second UE may repetitively transmits data using PRB #1 and PRB #9. Alternatively, as shown in FIG. 11, the first UE and the second UE repetitively transmit the same data using the same frequency resources while using different frequency hopping patterns.

Meanwhile, in case of repetitive transmission of the same data, frequency hopping may not be performed within one mini-slot in order to reduce complexity. When multiple mini-slots are used to repetitively transmit the same data, frequency hopping may be applied. When redundant or repetitive transmission occurs over several slots, a frequency different from a frequency used in the previous slot may be used in the next slot. That is, inter-slot FH may be applied. In this case, if a base station or a transmitting UE can trust channel information (a channel gain per each frequency, and the like), for example, frequency hopping is not applied and a frequency resource with a satisfactory channel condition may be allocated to repetitively transmit data.

Such frequency hopping-related information, for example, FH-related configuration information, may be semi-statically configured by a base station using higher layer radio resource control (RRC) signaling and the like and may be reported to a UE. In addition, control information related to FH may be included in DCI and transmitted through a PDCCH. In the case of a sidelink transmission environment, the FH-related information may be transmitted by a base station to a UE through higher layer signaling such as RRC or transmitted by a transmitting UE to a receiving UE. For example, the base station may inform a UE of information on whether FH is applied, information on an FH pattern, and the like through DCI. That is, the base station may include control information for transmitting and receiving data in DCI and inform the UE of the control information through such a transmission method. In this case, a new field may be added to the DCI. When a transmitting UE repetitively or redundantly transmits data to a receiving UE, the transmitting UE may inform the receiving UE of information on whether FH is applied, information on an FH pattern, and the like through sidelink control information (SCI).

In uplink transmission or downlink transmission, a base station may inform a UE of the length of a mini-slot and the repetition number of transmission through DCI. However, the repetition number of transmission may be set by being notifying through RRC in advance. As an example, the base station may notify a default repetition number of transmission through RRC, and when the default repetition number of transmission needs to be changed, may inform the UE of the actual repetition number of transmission through DCI. In this case, information on a difference between the default repetition number of transmission and the actual repetition number of transmission may be included in the DCI.

In sidelink transmission, a transmitting UE or a base station may inform a receiving UE of the length of the mini-slot and the repetition number of transmission through SCI or DCI.

Meanwhile, when frequency hopping is used, a separate demodulation reference signal (DMRS) may be applied to each repetitive transmission. However, when a transmitter repetitively transmits the same data to a receiver using the same frequency resource, the DMRS may not be separately used. That is, repetition may be performed multiple times using one DMRS. However, in case of rapidly changing channels, the DMRS may be separately used even if the same frequency resource is used. That is, a separate DMRS may be applied to each repetition.

Further, different numbers of DMRSs may be used according to services or QoS of the services during repetitions. For example, the DMRS may be separately applied to each repetition in the case of high-speed movement and repetition may be performed multiple times using one DMRS in the case of slow movement.

Figure 12:
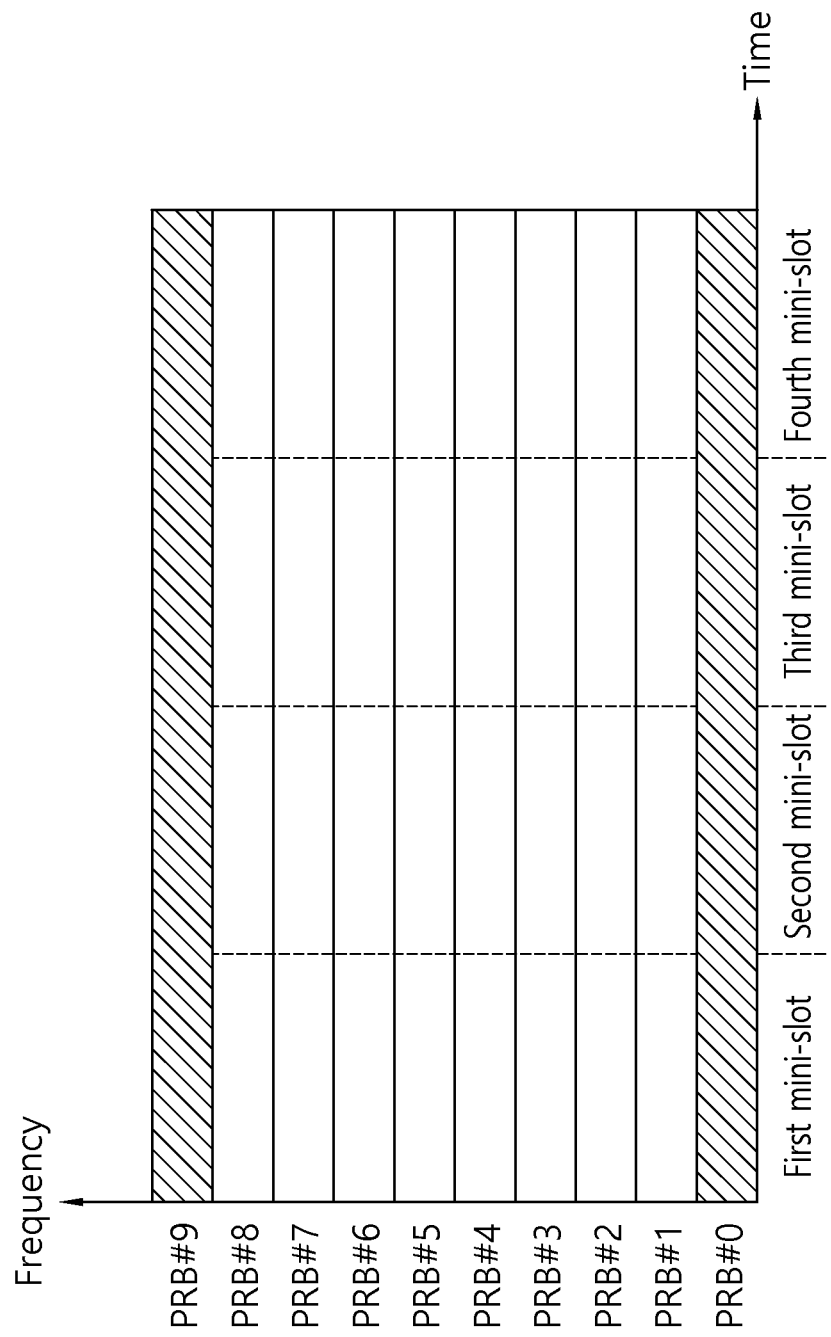

Meanwhile, in the case of very important information, the same information may be repetitively transmitted in the frequency domain and the time domain. For example, a transmitter may allocate multiple frequency resources and transmit the same information multiple times through the frequency resources. For example, as shown in FIG. 12, the transmitter may map the same data to PRB #0 and PRB #9 and transmit the same data through the first to fourth mini-slots. This method may be more suitable in an mm-Wave environment with many frequency resources and small time resources.

Figure 13:
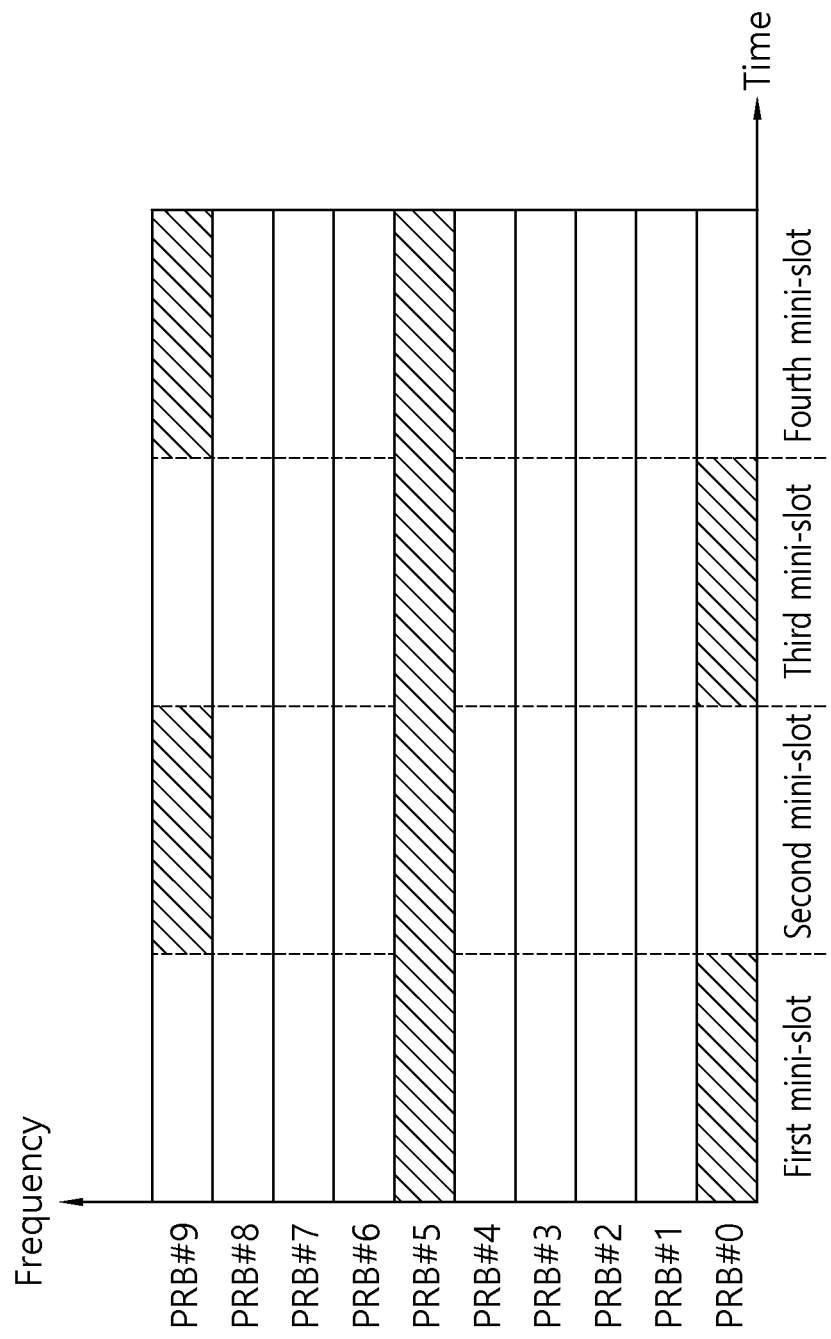

As another example, the transmitter may transmit the same information multiple times using both different frequency and time resources. For example, as shown in FIG. 13, the transmitter may perform frequency hopping using PRB #0 and PRB #9 when repetitively transmitting first data and repetitively transmit second data identical to the first data using an optimal frequency resource (RPB #5 in FIG. 13) based on CQI.

In the above-described embodiment, a frequency hopping resource may be derived based on Table 1 below.

TABLE 1

| Numbers of PRBs in initial active UL BPW | Value of NUL$_{hop}$ Hopping Bits | Frequency offset for $2^{nd}$ hop |
| --- | --- | --- |
| $N_{BWP}^{size} < 50$ | 0 | $\lfloor N_{BWP}^{size} \rfloor$ |
|  | 1 | $-\lfloor N_{BWP}^{size} \rfloor$ |
| $N_{BWP}^{size} \geq 50$ | 00 | $\lfloor N_{BWP}^{size}/2 \rfloor$ |
|  | 01 | $\lfloor N_{BWP}^{size}/4 \rfloor$ |
|  | 10 | $-\lfloor N_{BWP}^{size}/4 \rfloor$ |
|  | 11 | Reserved |

Referring to Table 1, a frequency hopping offset during repetition may be determined based on the number of RPBs in an active uplink BWP. In addition, a frequency hopping pattern may be determined according to the value of a hopping bit. This frequency hopping resource determination method may be equally applied to downlink.

Figure 14:
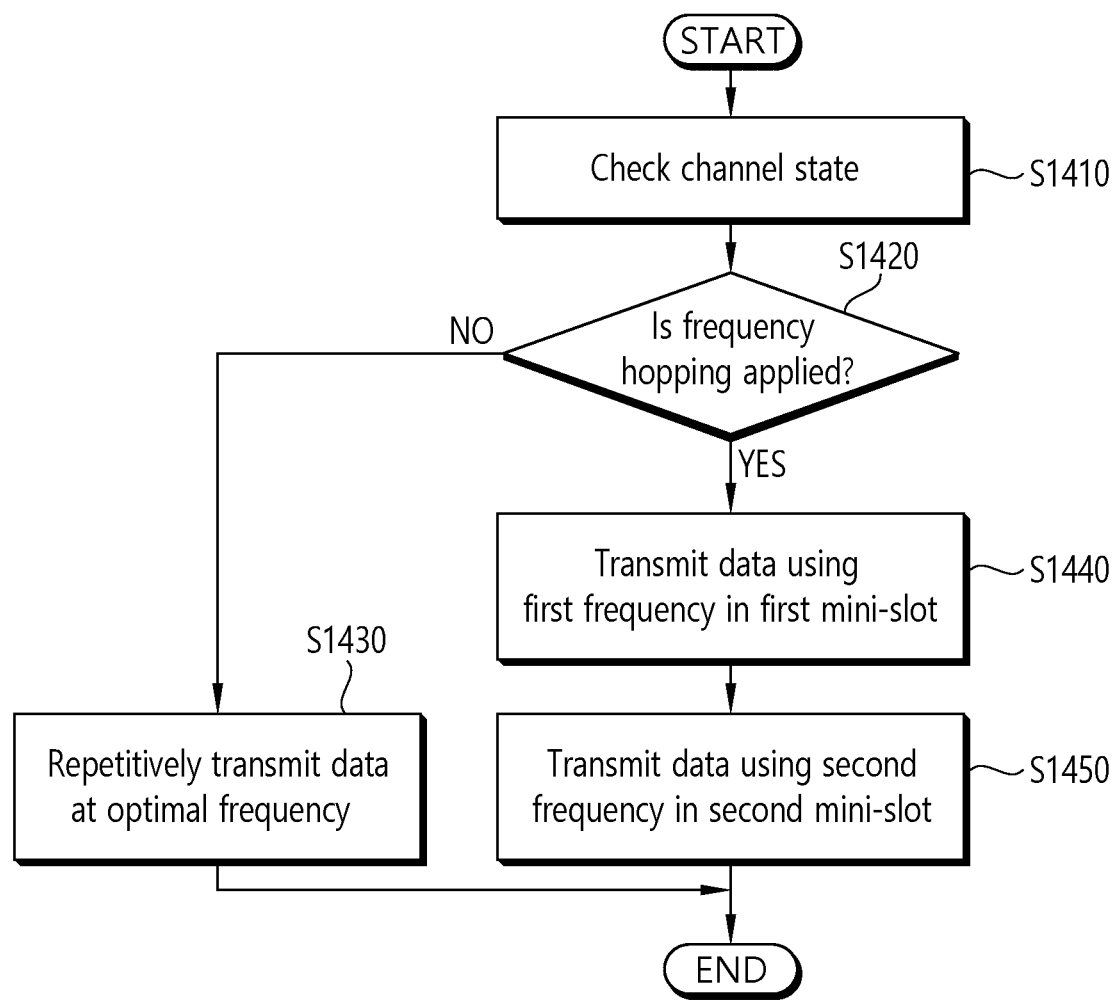
FIG. 14 is a flowchart showing a data transmission method according to an embodiment of the present disclosure.

FIG. 14 is a flowchart showing a data transmission method according to an embodiment of the present disclosure.

According to the present embodiment, a transmitter may repetitively transmit the same data to a receiver through various methods according to channel states. Here, the transmitter may be a base station or a transmitting UE and the receiver may be a base station or a receiving UE.

Hereinafter, as an example, a case in which a UE repetitively transmits uplink data to a base station will be described with reference to FIG. 14.

The base station may determine whether to apply frequency hopping to uplink data to be transmitted by the corresponding UE based on a CQI report received from the UE. To this end, the UE may check a channel state and transmit the CQI report to the base station (S1410). The base station may check the channel state based on a CQI value included in the CQI report received from the UE, determine that repetition of the data is performed without applying frequency hopping if the channel state is good, and determine that frequency hopping is applied during repetition if the channel state is not good or channel information is unknown or unreliable. In addition, the base station may transmit DCI including information on the repetition number of transmission of uplink data and information on frequency hopping to the corresponding UE. Here, the DCI may further include information on the length of a mini-slot used for repetition in addition to the information on the repetition number of transmission and the information on frequency hopping. In addition, the information on frequency hopping may include information on whether frequency hopping is applied and/or information on a frequency hopping pattern.

Upon reception of the DCI from the base station, the UE may determine whether to perform frequency hopping based on the DCI (S1420). If it is determined that repetition is performed without applying frequency hopping, the UE may repetitively transmit the same data using an optimal frequency resource (S1430). In this case, the UE may repetitively transmit the same data using a plurality of frequency and/or time resources according to the importance of the data.

However, if it is determined that frequency hopping is applied during repetitive transmission, the UE may transmit first data in a first mini-slot using a first frequency (S1440) and transmit the same data as the first data in a second mini-slot temporally adjacent to the first mini-slot using a second frequency according to frequency hopping (S1450). In this case, the UE may repetitively transmit the same data using at least one of the frequency hopping methods of FIGS. 7 to 13.

For example, when the DCI is received from the base station, the UE may configure a plurality of PUSCHs corresponding to the repetition number of transmission based on the information on the repetition number of transmission included in the DCI and determine frequency resources for transmission of the plurality of PUSCHs based on the information on frequency hopping included in the DCI. In this case, the uplink data may be equally mapped to the plurality of PUSCHs. In addition, the range of frequency hopping during repetition may be changed depending on the size of an active BWP for transmission of the corresponding uplink data.

<Communication Method Based on Adaptively Controlled Number of Transmissions>

Figure 15:
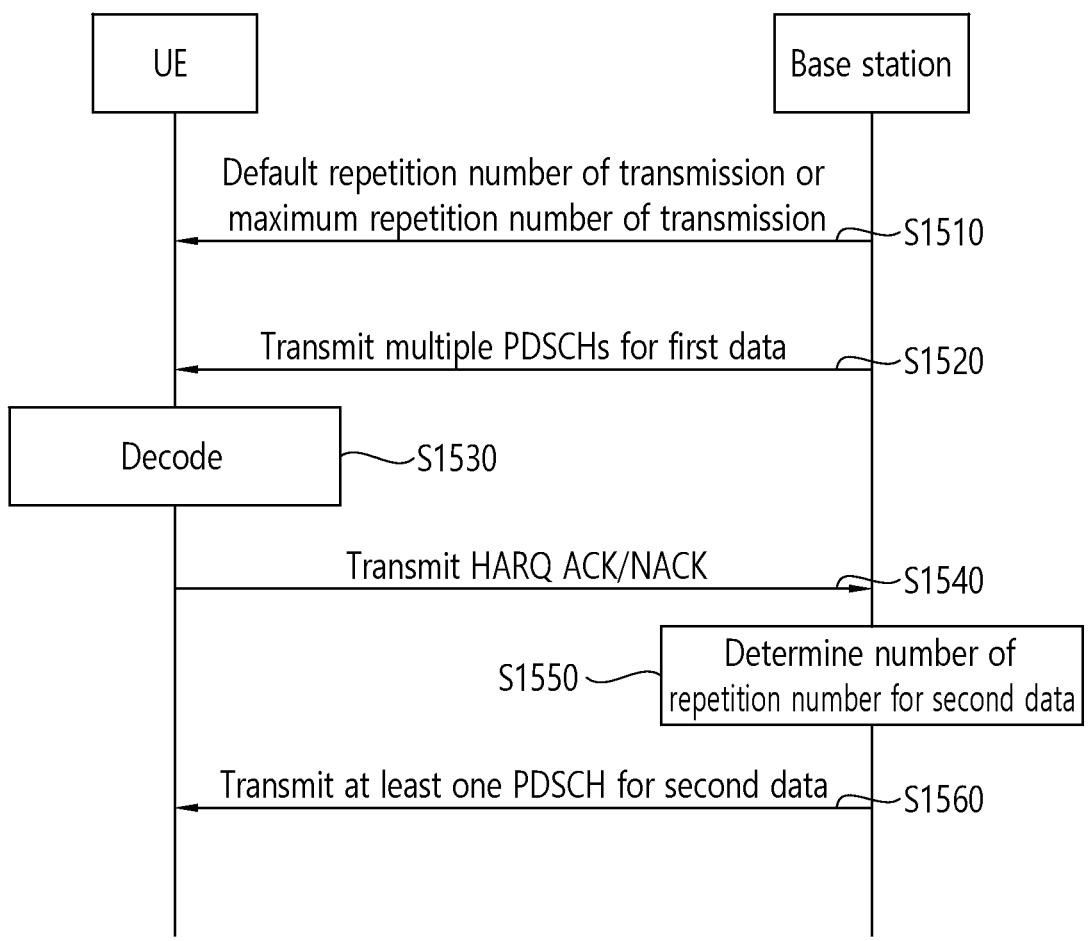
FIG. 15 is a flowchart showing a data transmission method according to another embodiment of the present disclosure.

FIG. 15 is a flowchart showing a data transmission method according to an embodiment of the present disclosure.

In the present embodiment, a transmitter may transmit the same information (same data) to a receiver redundantly or repetitively. When a UE transmits the same data to a base station repetitively or redundantly, the data may be PUSCH or PUSCH data. Alternatively, the data may be URLLC-related data. When the base station repetitively or redundantly transmits the same data to the UE, the data may be PDSCH or PDSCH data. Alternatively, the data may be URLLC-related data. When a transmitting UE repetitively or redundantly transmits the same data to a receiving UE, the data may be PSSCH or PSSCH data or may be data related to URLLC.

FIG. 15 illustrates an example of a case where the transmitter is a base station and the receiver is a UE.

Referring to FIG. 15, the repetition number of transmission and a maximum repetition number of transmission may be semi-statically or statically set by the base station through radio resource control (RRC) by default. For example, the base station may inform the UE of information on a default repetition number of transmission and/or the maximum repetition number of transmission through higher layer signaling such as an RRC message (S1510). That is, the maximum repetition number of transmission or the default repetition number of transmission may be set through RRC, or both may be set if necessary.

For example, the base station may configure a plurality of PDSCHs for first data based on information on the default repetition number of transmission or the maximum number of times of repetitive transmission. That is, the first data may be equally mapped to the plurality of PDSCHs. The base station may repetitively transmit the first data by transmitting the plurality of PDSCHs to which the first data is equally mapped to the UE using different time and/or frequency resources (S1520). Here, the maximum repetition number of transmission may be set as the default number of times of repetitive transmission. In this case, the base station may transmit only information on the maximum repetition number of transmission through an RRC message, and the UE may recognize that the maximum repetition number of transmission is used as the default number of times of repetitive transmission.

A receiver may transmit ACK/NACK in each repetition and a transmitter may determine an optimal repetition number of transmission in consideration of this. As an example, referring to FIG. 5, when the plurality of PDSCHs is received from the base station, the UE may decode the PDSCHs (S1530), transmit HARQ ACK for a successfully received PDSCH, and transmit HARQ NACK for a PDSCH having an error (S1540). The base station may determine the repetition number of transmission for second data (data repetitively transmitted after the first data) based on the number of HARQ ACKs and/or the number of HARQ NACKs received from the UE (S1550). In this case, the UE may use a chase combining (CC) method and/or an incremental redundancy (IR) method in determining the need for retransmission of corresponding data. The CC method may be used when the same redundancy version is applied to all of the plurality of PDSCHs, and the IR method may be used when different redundancy versions are applied to the plurality of PDSCHs. For example, if an error is generated in the first PDSCH when the UE decodes the plurality of PDSCHs, the UE may combine the first PDSCH with the second PDSCH to correct the error generated in the first PDSCH and/or the second PDSCH. When errors are generated in all of the plurality of PDSCHs, but the corresponding data has been successfully decoded as a result of combining the PDSCHs, the UE may transmit HARQ ACK instead of HARQ NACK for the last received PDSCH. In this case, the base station can be prevented from unnecessarily retransmitting the corresponding data while recognizing that the channel state is not good through HARQ feedback because the UE has successfully received the data.

After performing repetitive transmission, the transmitter determines that the channel state is very good if the number of ACKs for the repetitive transmission is equal to or greater than a reference value or if a ratio between the number of ACKs and the number of NACKs included in the corresponding feedback is equal to or greater than a reference ratio, and when transmitting the next data in a similar channel environment, reduce the number of repetitions and perform repetitive transmission. However, if the number of ACKs is less than the reference value or reference ratio, the transmitter may determine that the channel condition is not good, and when transmitting the next data (second data) in a similar channel environment (an environment corresponding to the channel environment when the first data is transmitted), increase the number of repetitions and perform repetitive transmission. That is, the repetition number of transmission for the second data may be changed when a channel environment when the second data is transmitted corresponds to a channel environment when the first data transmitted.

For example, when the base station receives a number of HARQ ACKs equal to or greater than the reference value for the plurality of PDSCHs from the UE, the base station may reduce the repetition number of transmission for the second data to be lower than the repetition number of transmission for the first data if the second data needs to be repetitively transmitted in a channel environment similar to that when the first data is repetitively transmitted. As another example, when the base station receives a number of HARQ ACKs less than the reference value for the plurality of PDSCHs from the UE, the base station may increase the repetition number of transmission for the second data to be greater than the repetition number of transmission for the first data if the second data needs to be repetitively transmitted in a channel environment similar to that when the first data is repetitively transmitted. Thereafter, the base station may inform the UE of information on the repetition number of transmission for the second data through DCI, configure a number of PDSCHs corresponding to the repetition number of transmission using the second data, and transmit the PDSCHs to the UE (S1560).

In this case, the base station may change the repetition number of transmission after performing repetition by the default number of times of repetitive transmission. The number of initial transmissions followed by update of the repetition number of transmission may be set as another parameter. (e.g., 1, 2, 4, 6, . . . )

For example, if a parameter for update of the repetition number of transmission is set to "2", the base station may repetitively transmit the first data and the second data by the default number of times of repetitive transmission, respectively, and then determine the number of repetitions for third data based on the number of HARQ ACKs and/or NACKs for the first data and/or the second data.

For repetition thereafter, the base station may change the same in real time within a range set through RRC, and the corresponding information may be included in DCI and signaled to the UE. For example, the base station may initially set the repetition number to a certain number through RRC and then signal only a difference between the repetition number of current repetitive transmission and the repetition number of previous transmission through DCI. Alternatively, only up or down for the repetition number of transmission may be signaled. For example, the base station may set the repetition number of transmission to (2, 4, 6, 8) through RRC and set the default repetition number of transmission to "2". In this case, when the base station indicates "up" for the repetition number of transmission through DCI, the UE may change the default repetition number of transmission from "2" to "4".

In addition, the base station may signal whether repetitive transmission is activated/deactivated through DCI. Therefore, according to the present embodiment, the repetition number of transmission can be optimized and thus the number of ACKs/NACKs can be reduced.

Meanwhile, in the present embodiment, repetitive transmission is applicable to both the time axis and the frequency axis. That is, the transmitter may dynamically set the repetition number of transmission of the same information using different time and/or frequency resources.

The more a high-frequency band is used during repetitive transmission, the more repetition may occur on the frequency axis. It may be advantageous to perform repetitive transmission on the frequency axis to achieve ultra-low latency. However, in some cases, a time resource may be repetitively used. For example, the transmitter may transmit first data using a first frequency source on a first slot or a first mini-slot and transmit the same data as the first data using a second frequency resource. As another example, the transmitter may transmit the first data using the first frequency resource in the first slot or the first mini-slot and transmit the same data as the first data using the first frequency resource or the second frequency resource in a second slot or a second mini-slot temporally adjacent to the first slot or the first mini-slot.

Meanwhile, as another embodiment, the repetition number of transmission may be changed according to channel state such as CQI. For example, the transmitter may decrease the repetition number of transmission when the channel state is good and increase the repetition number of transmission when the channel state is not good. Information on increase and/or decrease in the repetition number of transmission may be transmitted to the receiver through DCI, SCI, UCI, or the like. In this case, it may be more suitable for the number of repetitions to be set semi-statically rather than dynamically.

Figure 16:
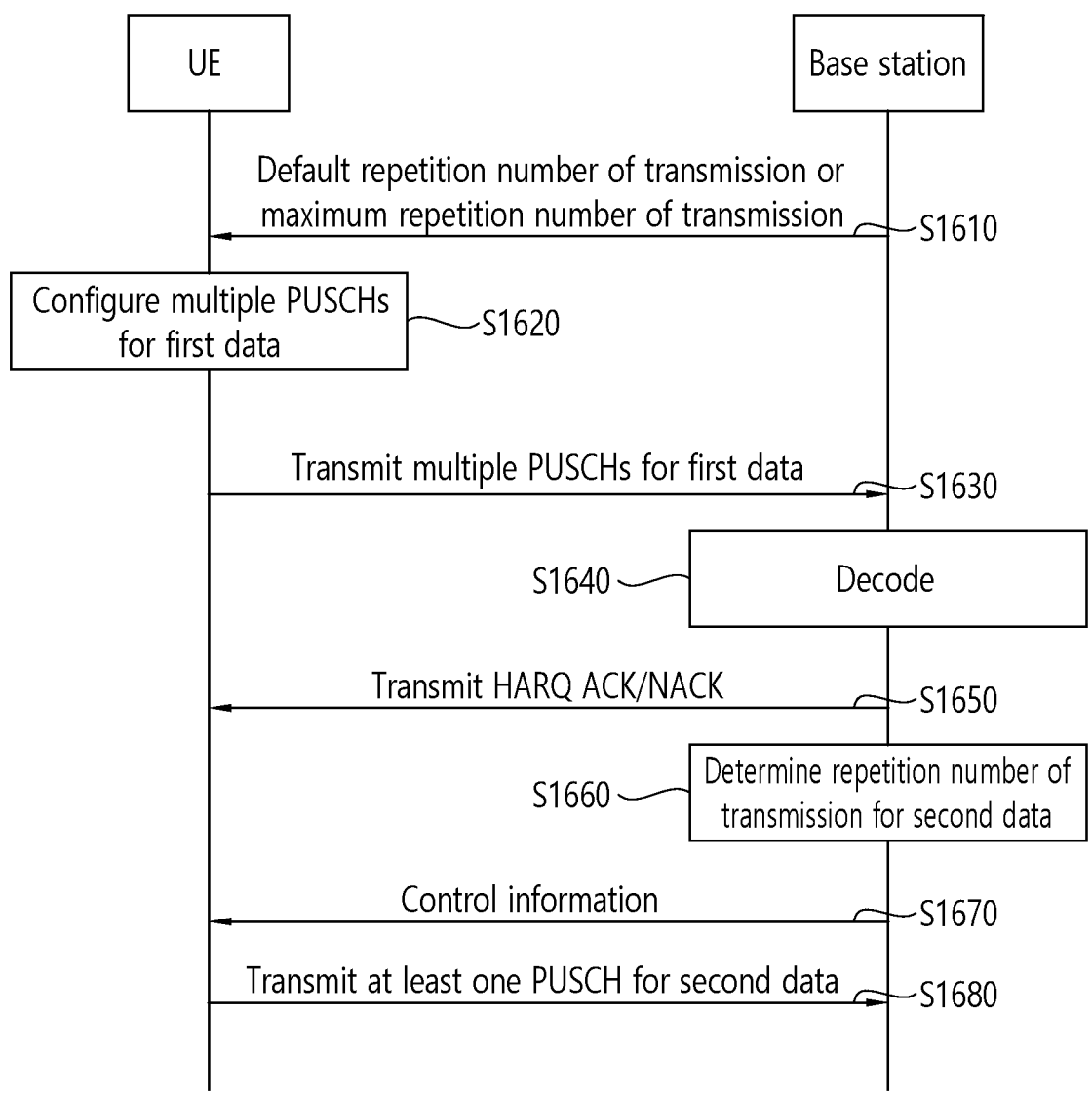
FIG. 16 is a flowchart showing a data transmission method according to another embodiment of the present disclosure.

FIG. 16 is a flowchart showing a data transmission method according to another embodiment of the present disclosure.

FIG. 16 shows a case where a transmitter is a UE and a receiver is a base station. However, repetitive transmission may be performed in a similar manner even when both the transmitter and the receiver are UEs.

Referring to FIG. 16, the repetition number of transmission and a maximum repetition number of transmission may be semi-statically or statically set by the base station through RRC by default. For example, the base station may inform the UE of a default repetition number of transmission and/or the maximum repetition number of transmission through higher layer signaling such as RRC (S1610). That is, a value set through RRC may be the maximum repetition number of transmission and/or the default number of times of repetitive transmission.

The UE may configure a plurality of PUSCHs for first data based on information on the maximum repetition number of transmission or the default repetition number of transmission (S1620). Here, the first data may be equally mapped to the plurality of PUSCHs. The UE may repetitively transmit the plurality of PUSCHs to the base station using different time and/or frequency resources (S1630).

Upon reception of the plurality of PUSCHs from the UE, the base station may decode them (S1640) and may transmit feedback (a plurality of ACKs/NACKs) for repetitive transmissions (the plurality of PUSCHs) to the UE (S1650). In this case, the base station may determine an optimal number of times of repetitive transmission based on the number of ACKs and/or the number of NACKs included in the feedback (S1660).

For example, when the plurality of PUSCHs is received from the UE, the base station may decode them, transmit a HARQ ACK for a successfully received PUSCH, and transmit a HARQ NACK for a PUSCH having an error. The base station may determine the repetition number of transmission for second data based on a channel state determined based on the PUSCHs received from the UE, the number of transmitted HARQ ACKs, and/or the number of transmitted HARQ NACKs.

In addition, the base station may use the CC method and/or the IR method in determining the necessity of retransmission of the corresponding data. For example, when an error is generated in the first PUSCH during decoding of the plurality of PUSCHs, the base station may combine the first PUSCH with the second PUSCH to correct the error generated in the first PUSCH and/or the second PUSCH. If errors are generated in all of the plurality of PUSCHs, but the data has been successfully decoded as a result of combining the PUSCHs, the base station may transmit a HARQ ACK instead of a HARQ NACK for the last received PUSCH such that the UE does not unnecessarily retransmit the data.

The transmitter may inform the receiver of information on the repetition number of transmission for the second data through control information such as DCI.

Although FIG. 16 illustrates that the repetition number of transmission is determined by the base station, for example, if the transmitter is a transmitting UE and the receiver is a receiving UE, the repetition number of transmission may be determined by the transmitting UE or the receiving UE.

<CBG-Based Transmission Method and Apparatus Therefor>

FIG. 17 is a diagram for describing the concept of a code block group applied to the present disclosure.

In the NR system, retransmission due to HARQ is performed in units of a code block group (CBG) which is smaller than the unit of a transport block (TB). As an example, referring to FIG. 17, one TB may be segmented into eight code blocks (CBs), and three code blocks may be grouped into one CBG. However, this is merely an example, and one CBG may be composed of one code block and one TB may be composed of one CBG.

FIG. 18 is a diagram illustrating a configuration of a PDSCH serving cell applied to an embodiment of the present disclosure and FIG. 19 is a diagram illustrating a configuration of a PUSCH serving cell applied to an embodiment of the present disclosure.

Referring to FIG. 18 and FIG. 19, in both uplink transmission and downlink transmission, a maximum of 2, 4, 6, or 8 CBGs per one TB may be configured by higher layer signaling. A CBG is a group of 2, 4, 6, or 8 code blocks, used as a unit of HARQ retransmission, and reflected in DCI.

DCI format 0_1 used for PUSCH scheduling is shown in Table 2 below, and DCI format 1_1 used for PDSCH scheduling is shown in Table 3 below.

TABLE 2

| Field | Bits | Usage |
| --- | --- | --- |
| Identifier for DCI formats | 1 | 0 is set for UL DCI |
| Carrier indicator | 0 or 3 | |
| UL/SUL indicator | 0 or 1 | 1 bit if UE is configured with SUL, 0 otherwise |
| Bandwidth part indicator | 0, 1, or 2 | |
| Frequency domain resource assignment | Variable | |
| Time domain resource assignment | 0, 1, 2, 3, or 4 | |
| Frequency hopping flag | 0 or 1 | 0 when frequency hopping not enabled, else 1 |
| Modulation and coding scheme | 5 | |
| New data indicator | 1 | |
| Redundancy version | 2 | |
| HARQ process number | 4 | |
| $1^{st}$ downlink assignment index | 1 or 2 | |
| $2^{nd}$ downlink assignment index | 0 or 2 | |
| TPC command for scheduled PUSCH | 2 | |
| SRS resource indicator | Variable | |
| Precoding information and number of layers | Variable | |
| Antenna ports | Variable | |
| CSI request | 0, 1, 2, 3, 4, 5, or 6 | |
| CBG transmission information | 0, 2, 4, 6, or 8 | Determined by higher layer parameter maxCodeBlockGroupsPerTransportBlock |
| PTRS-IMRS association | Variable | |
| Beta_offset indicator | 0 or 2 | 0 if betaOffset = semestatic, 2 otherwise |
| IMRS sequence initialization | 0 or 1 | 0 bit if the higher layer parameter transform precoder is enabled1 bit if he higher layer parameter transform precoder is disenabled |
| UL-SUH indicator | 1 | |

TABLE 3

| Field | Bits | Usage |
| --- | --- | --- |
| Identifier for DCI formats | 1 | value as 1, indication of DL DCI |
| Carrier Indicator | 0 or 0 | |
| Bandwidth part indicator | 0, 1, or 3 | |
| Frequency domain resource assignment | Variable | Similar to DCI 1_0 field |
| Time domain resource assignment | 0, 1, 2, 3, or 4 | |

TABLE 3-continued

| Field | Bits | Usage |
| --- | --- | --- |
| VRB-to-PRB mapping | 0 or 1 | 0 if prb-BundingType is not configured or is set to static, 1 otherwise |
| PRB bundling size indicator | 0 or 1 | |
| Rate matching indicator | 0, 1, or 2 | |
| ZP CSI-RS trigger | 0, 1, or 2 | |
| Modulation and coding scheme [TB1] | 5 | |
| New data indicator [TB1] | 1 | |
| Redundancy version [TB1] | 2 | |
| Modulation and coding scheme [TB2] | 5 | |
| New data indicator [TB2] | 1 | |
| Redundancy version [TB2] | 2 | |
| HARQ process number | 4 | |
| Downlink assignment index | 0, 2, or 4 | |
| TPC command for scheduled PUSCH | 2 | |
| PUCCH resource indicator | 3 | |
| PDSCH-to-HARQ_feedback timing indicator | 0, 1, 2, or 3 | |
| Antenna ports | 4, 5, or 6 | |
| SRS request | 2 | |
| CBG transmission information | 0, 2, 4, 6, or 8 | |
| CBG flushing out information | 0 or 1 | |
| IMRS sequence initialization | 0 or 1 | |

However, since URLLC data generally has a smaller data size than eMBB data and requires a low latency, the unit (or size) of the CBG needs to be set to a unit smaller than that of eMBB. Therefore, according to the present embodiment, a CBG for URLLC use may be set differently from a CBG for eMBB. As an example, the CBG for URLLC may be composed of 1, 2, 3 or 4 code blocks. Alternatively, in the case of URLLC, a maximum number of CBGs included in one TB may be set to 4, 8, 12, or 16. That is, when URLLC data is retransmitted, a maximum number of CBGs included in the TB is determined according to the TB size, and as a result, the size unit of retransmitted data may be set to be smaller than that of eMBB.

For example, in the case of URLLC, if the TB size is the same as that of eMBB, a maximum number of CBGs per TB for URLLC may be set to be larger than that of eMBB. If the TB size is smaller than that of eMBB, the maximum number of CBGs per TB for URLLC may be set to be similar to that of eMBB. That is, according to an embodiment, the maximum number of CBGs per TB for URLLC may be set by RRC separately from the maximum number of CBGs per TB for eMBB.

Information on CBGs for URLLC may be indicated by RRC, and if necessary, DCI settings may be changed or added to reflect this. As an example, a field with respect to CBG transmission information for URLLC may be added to DCI format 0_1 of Table 1 and/or DCI format 1_1 of Table 2. For example, the CBG transmission information for URLLC may be set to any one of 0, 2, 4, 6, 8, 10, 12, 14 and 16 bits and indicate that the corresponding CBG is to be retransmitted when URLLC data is retransmitted in the form of a bitmap.

Meanwhile, the maximum number of CBGs per TB for URLLC may be set through RRC separately from the maximum number (2, 4, 6, 8) of CBGs per TB currently set for eMBB. As an example, the maximum number of CBGs per TB for URLLC may be configured in the RRC message of FIG. 6 and/or FIG. 7.

In addition, {n1, n2, n4, n8} may be added as information on the number of CB s (CodeBlocksPerCodeBlockGroup for URLLC) per CBG. As another example, {n4, n8, n12, n16} may be added to the RRC message of FIG. 6 and/or FIG. 7 as information on the maximum number of CBGs (maxCodeBlockGroupsPerTransportBlock for URLLC) per TB for URLLC.

As another example, instead of separately setting CBGs for URLLC through RRC, data may be mapped to a separate table for URLLC such that the maximum number (2, 4, 6, 8) of CBGs per TB is recognized as (4, 8, 12, 16) if the data corresponds to URLLC. For example, if the number of CBGs per TB for eMBB data is set to "2" by a base station, a UE may set the number of CBGs per TB to "4" for URLLC data based on information set in the table for URLLC and retransmit only a CBG including data having an error among four CBGs.

When this method is applied, retransmission time of URLLC data due to HARQ can be reduced and retransmission of URLLC data having a relatively small data size can be performed more efficiently.

Figure 20:
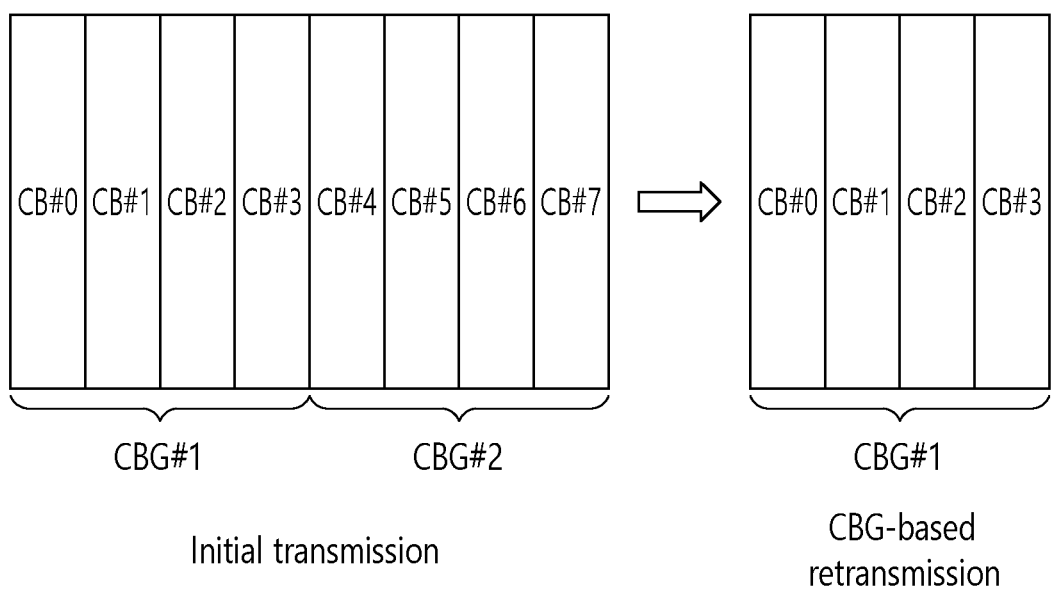
FIG. 20 is a diagram for describing a case of retransmitting eMBB data according to an embodiment.
Figure 21:
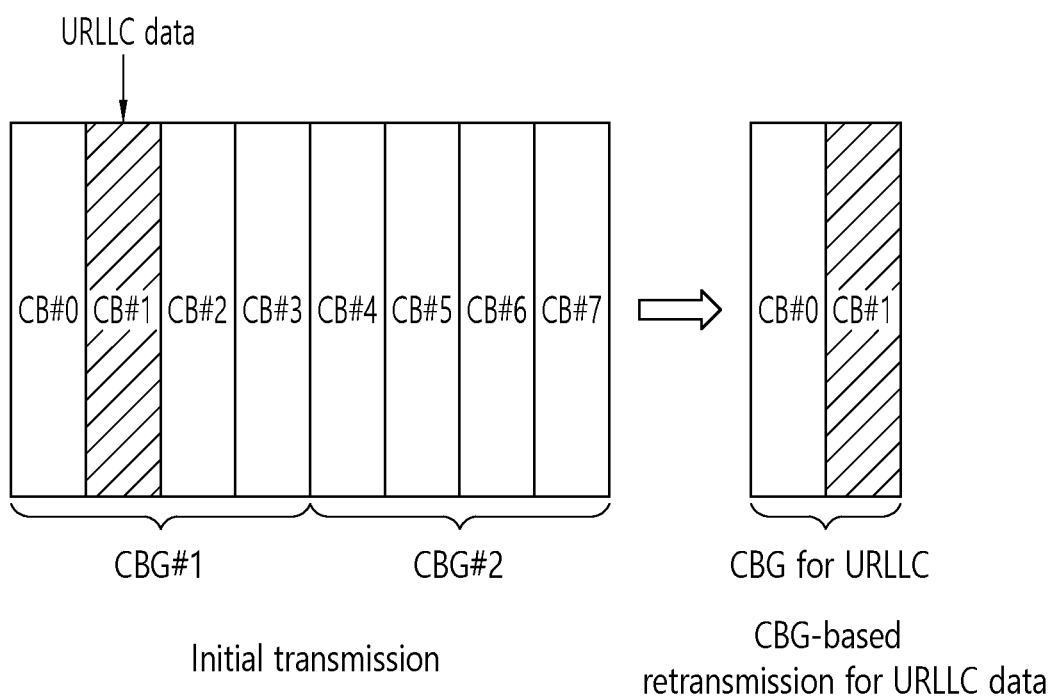
FIG. 21 is a diagram for describing a case of retransmitting URLLC data according to an embodiment.

FIG. 20 is a diagram for describing a case of retransmitting eMBB data according to an embodiment and FIG. 21 is a diagram illustrating a case of retransmitting URLLC data according to an embodiment.

Referring to FIG. 20, a case in which one TB is configured by 2 CBGs and one CBG is composed of 4 CBs is illustrated. When a transmitter initially transmits eMBB data, CBs #0 to CB #7 are transmitted to a receiver because the transmitter performs transmission in units of a TB.

In this case, if an error is generated in at least one of CB #0 to CB #3, that is, if the transmitter receives a HARQ NACK for at least one of CB #0 to CB #3 from the receiver, the transmitter retransmits only CGB #1 including the corresponding CB. On the other hand, as shown in FIG. 21, if the CB (CB #1) having an error corresponds to URLLC data in the same situation as in FIG. 20, the transmitter may configure a CGB having a size smaller than the size of the CBG for eMBB data and retransmit the corresponding data. To this end, the transmitter may increase the number of CBGs of the initially transmitted TB by increasing a maximum number of CGBs per TB when retransmitting the URLLC data or may decrease the number of CB s per CGB. Therefore, according to the present embodiment, since the URLLC data can be retransmitted in a smaller unit as compared to a case in which eMBB data is retransmitted, retransmission with lower latency and higher efficiency can be performed.

Figure 22:
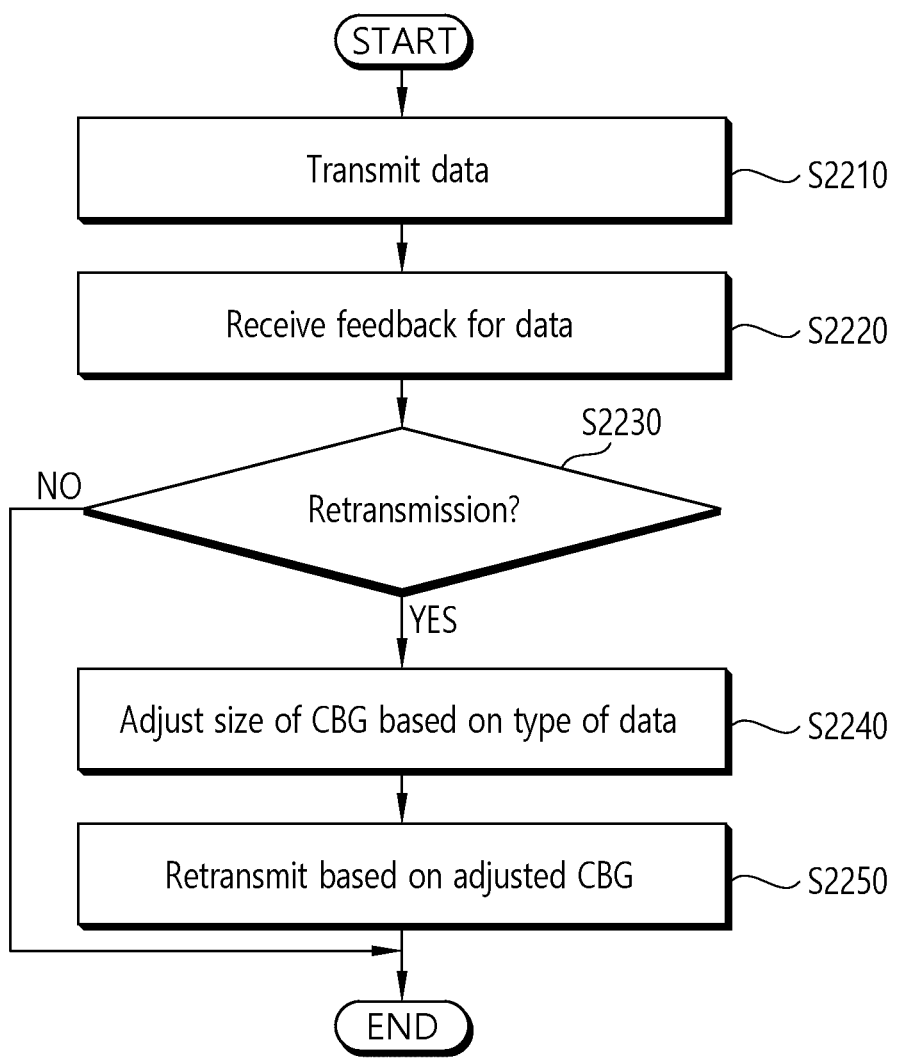
FIG. 22 is a flowchart showing a data transmission method according to another embodiment of the present disclosure.

FIG. 22 is a flowchart showing a data transmission method according to an embodiment of the present disclosure.

Hereinafter, a method in which a transmitter transmits data to a receiver according to the present embodiment will be described with reference to FIG. 22. In the present embodiment, when the transmitter is a base station, the receiver may be a UE. When the transmitter is a UE, the receiver may be a base station or another UE. When the receiver is a base station, the data may be URLLC data, uplink data, a PUSCH or PUSCH data. When the receiver is another UE, the data may be URLLC data, sidelink data, a PSSCH or PSSCH data. When the transmitter is a base station, the data may be URLLC data, downlink data, a PDSCH or PDSCH data.

For example, when the transmitter is a UE and the receiver is a base station, the UE transmits uplink data to the base station (S2210) and receives a feedback for the uplink data from the base station (S2220). Here, the feedback may be HARQ ACK or HARQ NACK for the uplink data.

The UE may determine whether to retransmit the uplink data based on the feedback (S2230). If the feedback for the uplink data transmitted to the base station is ACK, the UE determines that the corresponding data has been successfully transmitted and omits retransmission of the corresponding data. That is, the data is not retransmitted. However, if NACK is included in the feedback, the UE may retransmit the corresponding data. In this case, the UE may adjust the size of the CBG of the uplink data based on the type of the uplink data that needs to be retransmitted and perform retransmission in units of the adjusted CBG. For example, when the data corresponding to the NACK is eMBB data, the UE may retransmit a CGB including a code block having an error to the base station, as shown in FIG. 20. However, when the data corresponding to the NACK is URLLC data, the UE may adjust the size of the CBG as shown in FIG. 21 (S2240) and perform retransmission based on the adjusted CGB (S2250). In this case, the size of the CBG for retransmission of the URLLC data may be set to be smaller than the size of the CBG for retransmission of eMBB data such that the URLLC data can be transmitted more rapidly with fewer resources. Information on this (information on the size of the CBG for retransmission of the URLLC data) may be received from the base station through at least one of an RRC message and DCI. In this case, the code block group for retransmission of eMBB data may include 2, 4, 6, or 8 code blocks, and the code block group for retransmission of the URLLC data may include 1, 2, 3 or 4 code blocks.

As another example, when the transmitter is a base station and the receiver is a UE, when a feedback for downlink data transmitted to the UE is received from the UE, the base station determines whether to retransmit the data based on the feedback. If the feedback is ACK, the base station determines that the corresponding data has been successfully transmitted and transmits the next data. However, if NACK is included in the feedback, the base station may adjust the size of the CBG based on the type of the corresponding data and perform retransmission in units of the adjusted CBG. For example, when the data corresponding to NACK is eMBB data, the base station may retransmit a CGB including a code block having an error to the UE as shown in FIG. 20. However, when the data corresponding to NACK is URLLC data, the base station may adjust the size of the CBG as shown in FIG. 21 (S2240) and perform retransmission based on the adjusted CGB (S2250). In this case, the base station may transmit information on the size of the CBG for retransmission of URLLC data to the UE through DCI. Alternatively, the information on the size of the CBG for retransmission of the URLLC data may be transmitted to the UE in advance through an RRC message. Here, the information on the size of the CBG for retransmission of the URLLC data may be information on a maximum number of code block groups per TB for the URLLC data and may be set separately from information on a maximum number of code block groups per TB for eMBB data.

Figure 23:
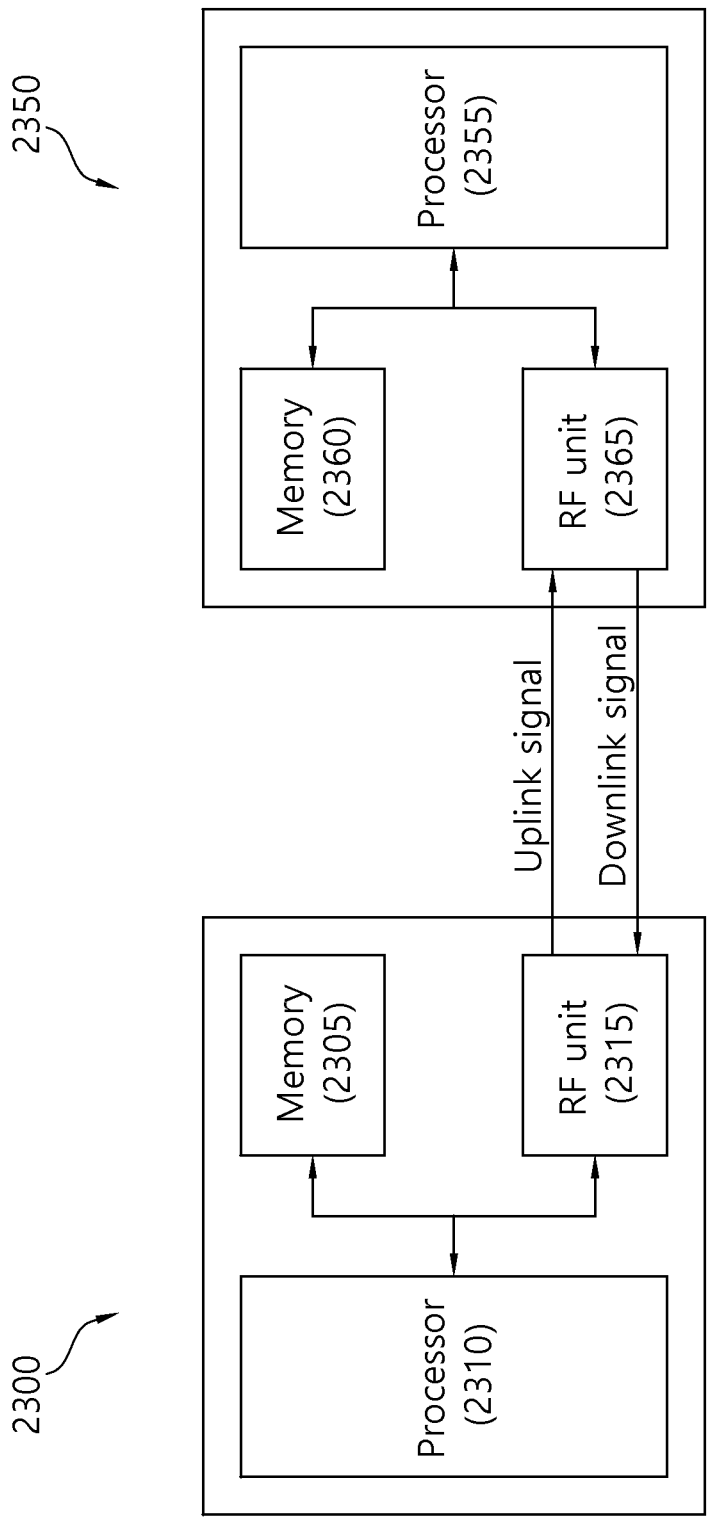
FIG. 23 is a block diagram showing a wireless communication system in which an embodiment of the present disclosure is implemented.

FIG. 23 is a block diagram showing a wireless communication system in which an embodiment of the present disclosure is implemented.

Referring to FIG. 23, a UE 2300 includes a memory 2305, a processor 2310, and a radio frequency (RF) unit 2315. The memory 2305 is connected to the processor 2310 and stores various types of information for driving the processor 2310. The RF unit 2315 is connected to the processor 2310 to transmit and/or receive radio signals. For example, the RF unit 2315 may receive configuration and/or control information such as an RRC message and DCI, and a downlink signal such as a PDSCH described in the present description from a base station 2350.

In addition, the RF unit 2315 may transmit an uplink signal such as a CQI report and a PUSCH described in the present description the base station 2350 or may transmit/receive a PSSCH to/from another UE (not shown).

The processor 2310 implements functions, processes and/or methods of the UE proposed in the present description. Specifically, the processor 2310 performs the operation of the UE according to FIGS. 7 to 22. For example, the processor 2310 may configure a plurality of PUSCHs or a plurality of PSSCHs according to an embodiment of the present disclosure and transmit the same using the data transmission method according to any one of FIGS. 7 to 23. In all embodiments of the present description, the operation of the UE 2300 may be implemented by the processor 2310.

The memory 2305 may store control information and configuration information according to the present description and may provide the control information and the configuration information to the processor 2310 at the request of the processor 2310.

The base station 2350 includes a processor 2355, a memory 2360, and a radio frequency (RF) unit 2365. The memory 2360 is connected to the processor 2355 and stores various types of information for driving the processor 2355. The RF unit 2365 is connected to the processor 2355 to transmit and/or receive radio signals. The processor 2355 implements the functions, processes and/or methods of the base station proposed in the present description. In the above-described embodiments, the operation of the base station may be implemented by the processor 2355. The processor 2355 may generate an RRC message, downlink control information, and the like described in the present description or configure a plurality of PDSCHs.

The processor may include an application-specific integrated circuit (ASIC), other chipsets, logic circuits, and/or data processing devices. The memory may include a read-only memory (ROM), a random access memory (RAM), a flash memory, a memory card, a storage medium, and/or other storage devices. The RF unit may include a baseband circuit for processing a radio signal. When an embodiment of the present disclosure is implemented as software, the above-described technique may be implemented as a module (a process, a function, etc.) that performs the above-described functions. The module may be stored in a memory and executed by a processor. The memory may be provided inside or outside the processor and may be connected to the processor by various well-known means.

In the exemplary system described above, the methods are described as a series of steps or blocks on the basis of flowcharts, but the present disclosure is not limited to the order of steps, and some steps may occur in a different order or concurrently with other steps as described above. In addition, those skilled in the art will understand that the steps shown in the flowcharts are not exclusive and that other steps may be included or one or more steps in the flowcharts may be deleted without affecting the scope of the present disclosure.

What is claimed is:

1. A method of transmitting data by a user equipment in a wireless communication system comprising:
   receiving, from a base station, configuration information adjusting a range of frequency hopping;
   receiving, from the base station, information for number of repetitions of uplink data on the frequency hopping;
   receiving, from the base station, downlink control information for the frequency hopping;
   configuring physical uplink shared channel (PUSCH) repetitions to transmit the uplink data correspond to the number of repetitions; and
   performing the frequency hopping for the PUSCH repetitions,
   wherein the performing frequency hopping includes:
      a first PUSCH repetition, using a plurality of resource blocks (RBs) including a first basic resource block (RB), and
      a second PUSCH repetition, using a plurality of RBs including a second basic RB which is apart from the first basic RB with an offset, and
   wherein the offset between the first basic RB and the second basic RB is determined based on a size of bandwidth part (BWP) which is activated for transmitting the uplink data.

2. The method of claim 1, wherein the downlink control information includes information on length of mini-slot used for repetition transmissions of the uplink data, and the PUSCH repetitions are performed in unit of the mini-slot.

3. The method of claim 1, wherein the plurality of RBs including the first basic RB and the plurality of RBs including the second basic RB are frequency resources corresponding to both ends of the activated BWP respectively.

4. The method of claim 1 further comprises:
   transmitting channel quality information to the base station, wherein the downlink control information for the frequency hopping is determined based on the channel quality information.

5. The method of claim 1, wherein different demodulation reference signal (DM-RS) is applied to each PUSCH repetition.

6. The method of claim 1 further comprises:
   receiving from the base station information on default number of repetitions of the uplink data, wherein the downlink control information includes information on a difference value between the default number of repetitions and actual number of repetitions of the uplink data.

7. A user equipment transmitting data in a wireless communication system, the user equipment comprising:
   a Radio Frequency (RF) unit configured to receive from a base station configuration information adjusting a range of frequency hopping, to receive from the base station information for number of repetitions of uplink data on the frequency hopping, and to receive from the base station downlink control information for the frequency hopping; and
   a processor configured to configure physical uplink shared channel (PUSCH) repetitions to transmit the uplink data correspond to the number of repetitions, and to perform the frequency hopping for the PUSCH repetitions,
   wherein for a first PUSCH repetition,. the processor uses a plurality of resource blocks (RBs) including a first basic RB, and for a second PUSCH repetition, the processor uses a plurality of RBs including a second basic RB which is a apart from the first basic RB with an offset,
   and wherein the offset between the first basic RB and the second basic RB is determined based on a size of bandwidth part (BWP) which is activated for transmitting the uplink data.

8. The user equipment of claim 7, wherein the downlink control information includes information on length of mini-slot used for repetition transmission of the uplink data, and the PUSCH repetitions are performed in unit of the mini-slot.

9. The user equipment of claim 7, wherein the plurality of RBs including the first basic RB and the plurality of RBs including the second basic RB are frequency resources corresponding to both ends of the activated BWP respectively.

10. The user equipment of claim 7, wherein the RF unit transmits channel quality information to the base station, and
wherein the downlink control information for the frequency hopping is determined based on the channel quality information.

11. The user equipment of claim 7, wherein different demodulation reference signal (DM-RS) is applied to each PUSCH repetition.

12. The user equipment of claim 7, wherein the RF unit receives from the base station information on default number of repetitions of the uplink data, and
wherein the downlink control information includes information on a difference value between the default number of repetitions and actual number of repetitions of the uplink data.

13. A method of receiving data by a base station in a wireless communication system comprising:
transmitting, to a user equipment, configuration information adjusting a range of frequency hopping
transmitting to the user equipment, information number of repetitions of uplink data on the frequency hopping;
transmitting, to the user equipment, downlink control information for the frequency hopping; and
configuring physical uplink shared channel (PUSCH) repetitions for the uplink data correspond to the number of repetitions,
wherein a first PUSCH repetition of the frequency hopping uses a plurality of resource blocks (RBs) including a first basic RB, and for a second PUSCH repetition of the frequency hopping uses a plurality of RBs including a second basic RB which is a apart from the first basic RB with an offset, and
wherein the offset between the first basic RB and the second basic RB is determined based on a size of bandwidth part (BWP) which is activated for transmitting the uplink data.

14. The method of claim 13, wherein the downlink control information includes information on length of mini-slot used for repetition transmission of the uplink data, and the PUSCH repetitions are performed in unit of the mini-slot.

15. The method of claim 13, wherein the plurality of RBs including the first basic RB and the plurality of RBs including the second basic RB are frequency resources corresponding to both ends of the activated BWP respectively.

16. The method of claim 13, further comprises:
receiving channel quality information from the user equipment, wherein the downlink control information on the frequency hopping is determined based on the channel quality information.

17. The method of claim 13, wherein different demodulation reference signal (DM-RS) is applied to each PUSCH repetition.

18. The method of claim 13, further comprises:
transmitting to the user equipment information on default number of repetitions of the uplink data,
wherein the downlink control information includes information on a difference value between the default number of repetitions and actual number of repetitions of the uplink data.

19. A base station receiving data in a wireless communication system, the base station comprising:
a Radio Frequency (RF) unit configured to transmit to a user equipment configuration information adjusting a range of frequency hopping, to transmit to the user equipment information number of repetitions of uplink data on a frequency hopping, and to transmit to the user equipment downlink control information for the frequency hopping; and
a processor configured to configure physical uplink shared channel (PUSCH) repetitions for the uplink data correspond to the number of repetitions,
wherein for a first PUSCH repetition of the frequency hopping, the processer uses a plurality of resource blocks (RBs) including a first basic RB, and for a the second PUSCH repetition of the frequency hopping, the processor uses a plurality of RBs including a second basic RB which is apart from the first basic RB with an offset, and
wherein the offset between the first basic RB and the second basic RB is determined based on a size of bandwidth part (BWP) which is activated for transmitting the uplink data.

20. The base station of claim 19, wherein the downlink control information includes information on length of mini-slot used for repetition transmission of the uplink data, and the PUSCH repetitions are performed in unit of the mini-slot.

21. The base station of claim 19, wherein the plurality of RBs including the first basic RB and the plurality of RBs including the second basic RB are frequency resources corresponding to both ends of the activated BWP respectively.

22. The base station of claim 19, wherein the RF unit receives channel quality information from the user equipment, wherein the downlink control information on the frequency hopping is determined based on the channel quality information.

23. The base station of claim 19, wherein different demodulation reference signal (DM-RS) is applied to each PUSCH repetition.

24. The base station of claim 19, wherein the RF unit transmits to the user equipment information on default number of repetition of the uplink data, and
wherein the downlink control information includes information on a difference value between the default number of repetitions and actual number of repetitions of the uplink data.

* * * * *